United States Patent [19]
Ishige

[11] Patent Number: 6,016,299
[45] Date of Patent: Jan. 18, 2000

[54] DISK LOADING MECHANISM FOR DISK REPRODUCING APPARATUS

[75] Inventor: Kiyoshi Ishige, Chiba, Japan

[73] Assignee: Sony Corporation, Tokyo, Japan

[21] Appl. No.: 08/900,590

[22] Filed: Jul. 25, 1997

[30]     Foreign Application Priority Data

Jul. 26, 1996 [JP] Japan .................................. 8-198208

[51] Int. Cl.[7] .................................................. G11B 33/02
[52] U.S. Cl. ......................................................... 369/75.2
[58] Field of Search ................................. 369/75.2, 77.1, 369/77.2, 270, 271; 360/99.02, 99.06

[56]          References Cited

U.S. PATENT DOCUMENTS

| | | | |
|---|---|---|---|
| 4,980,883 | 12/1990 | Motou et al. ........................... | 369/291 |
| 5,038,337 | 8/1991 | Muramatsu et al. ................... | 369/77.1 |
| 5,255,255 | 10/1993 | Kaneda et al. ......................... | 369/77.1 |
| 5,416,763 | 5/1995 | Ohsaki ................................... | 369/77.1 |
| 5,682,369 | 10/1997 | Nakamichi ............................. | 369/75.2 |
| 5,719,844 | 2/1998 | Abe ........................................ | 369/77.1 |

*Primary Examiner*—George J. Letscher
*Attorney, Agent, or Firm*—Limbach & Limbach L.L.P.

[57]          ABSTRACT

A pair of disk holders each having a groove for holding a periphery portion of an optical disk are provided. The disk holders are supported so as to be movable in a direction crossing the insertion direction of the optical disk. The disk holders are biased by a biasing member in such a direction as to make them approach each other. The disk holders are individually biased by biasing members in such a direction as to make them apart from the optical disk. When insertion of the optical disk is started, the optical disk is gripped by the pair of disk holders from its both sides, and then drawn into and carried to a disk chucking position by a disk loading mechanism.

5 Claims, 17 Drawing Sheets

DISK LOADING MECHANISM FOR DISK REPRODUCING APPARATUS

BACKGROUND OF THE INVENTION

The present invention relates to a disk reproducing apparatus such as a disk drive or the like for recording (writing) and/or reproducing (reading) information by using a disk-like recording medium such as an optical disk or an optical magnetic disk or the like as an information recording medium.

Conventionally in general in an optical disk functioning as a disk-like recording medium, there are three kinds: a read-only type optical disk such as a CD (compact disk) and a CD-ROM, a write once type optical disk allowing writing once, and a rewritable type allowing writing again. In a disk drive for recording/reproducing information by using these optical disks as a information recording medium, an optical disk is mounted horizontally on a turn table attached to the rotation shaft of a spindle motor and is driven to rotate. On the other hand, an information recording surface of the optical disk is exposed to a laser beam or the like perpendicularly by using an objective lens of an optical pickup. While horizontally moving the objective lens radially outward from the center of the optical disk, information is recorded on the information recording surface or information recorded on the information recording surface is reproduced.

The optical disk has a disk substrate formed to take the shape of a disk by using a synthetic resin material such as polycarbonate, and a signal recording surface formed on one main surface of this disk substrate. On the signal recording surface of the optical disk, a thin film made of a metal material such as aluminum is formed as a reflective layer.

The optical disk having such a configuration is mounted on a disk drive having the optical pickup to record and/or reproduce an information signal. This disk drive has a disk loading mechanism for mounting an optical disk on a disk mounting portion, and a rotation operation mechanism for holding the mounted optical disk so as to be opposed to the optical pickup and for rotating and operating the optical disk. This rotation operation mechanism forms the disk mounting portion for mounting the optical disk thereon. The optical disk inserted into an exterior casing of the disk drive from its outside is carried by the disk loading mechanism and mounted on the disk mounting portion.

As this disk loading mechanism, a disk loading mechanism of a so-called slot-in type has been proposed. This disk loading mechanism of slot-in type has a mechanism for carrying an optical disk inserted from a slot formed in the exterior casing to the disk mounting portion along the main surface of this optical disk, actuating a positioning member to position the optical disk with respect to the disk mounting portion and mount the optical disk, and thereafter separating the positioning member from the optical disk.

According to means for carrying the optical disk from the outside to the disk mounting portion, the disk drive of this kind is broadly classified into two groups, i.e., a group using a tray system and a group using a roller system.

In the tray system, a member called a tray for mounting an optical disk horizontally is formed so as to be able to be put into and out of the exterior casing. By drawing the tray with the optical disk mounted horizontally thereon into the exterior casing, the optical disk is carried to a disk chucking position by the tray and chucked in a turn table forming a part of the rotation operation mechanism. In the roller system, the optical disk is pinched from both sides of the main surface by a pair of rollers. By rotating the rollers, the optical disk inserted from a slot of the front face of the apparatus is drawn into the apparatus.

In such a disk loading mechanism of the conventional disk reproducing apparatus, however, it was necessary to install the optical disk positioning member and the mechanism for moving the positioning member. Therefore, the conventional disk loading mechanism had a problem of complicating the apparatus configuration.

In the disk drive of the tray system, the mechanism becomes comparatively simple and the cost thereof is low. At the present time, therefore, this tray system is the mainstream. Since the tray member has a large thickness, however, the whole apparatus becomes large in size. In addition, since the tray projects outside the apparatus, a user always needs to secure the space for projection of the tray. Especially in the case where the apparatus is mounted on a computer, these facts caused dissatisfaction of the user.

In the roller system, power is required for each of the rotation of the roller and the chucking operation of the disk, resulting in a high cost of the apparatus. In addition, since the optical disk is carried by pinch friction of the rollers, problems concerning durability and reliability, such as malfunction and possibility of a bad effect caused on the information recording surface by flaws due to roller slip and so on, have been pointed out. Thus, strict quality control for components such as the rollers and so on was demanded.

SUMMARY OF THE INVENTION

In view of such problems of the conventional technique, the present invention was made. An object of the present invention is to provide a disk reproducing apparatus capable of simplifying the apparatus configuration, reducing the size and weight of the apparatus, and suppressing electric power dissipation, and suitable for being applied to a disk drive formed for indoor use such as a disk drive mounted on a computer or the like.

Another object of the present invention is to provide a disk reproducing apparatus capable of loading and unloading a disk stably and certainly.

In order to solve the above described problem and achieve the above described object, a disk reproducing apparatus, which reproduces information recorded on an information recording surface of a disk-like recording medium, according to the present invention has a pair of disk holders each having a groove for holding a periphery portion of a disk-like recording medium, a first biasing means for supporting the pair of disk holders so as to be movable in a direction crossing the insertion direction of the disk-like recording medium and biasing the pair of disk holders in such a direction as to make them approach each other, a second biasing means for biasing the pair of disk holders in such a direction as to make them leave the disk-like recording medium, and a loading means, in response to insertion start of the disk-like recording medium, for carrying the disk-like recording medium held by the disk holders to a disk chucking position.

Owing to the configuration according to the present invention described above, a disk-like recording medium can be sandwiched between and supported by a pair of disk sandwiching members and carried positively by a simple structure.

DESCRIPTION OF THE PREFERRED EMBODIMENTS

Figure 1:
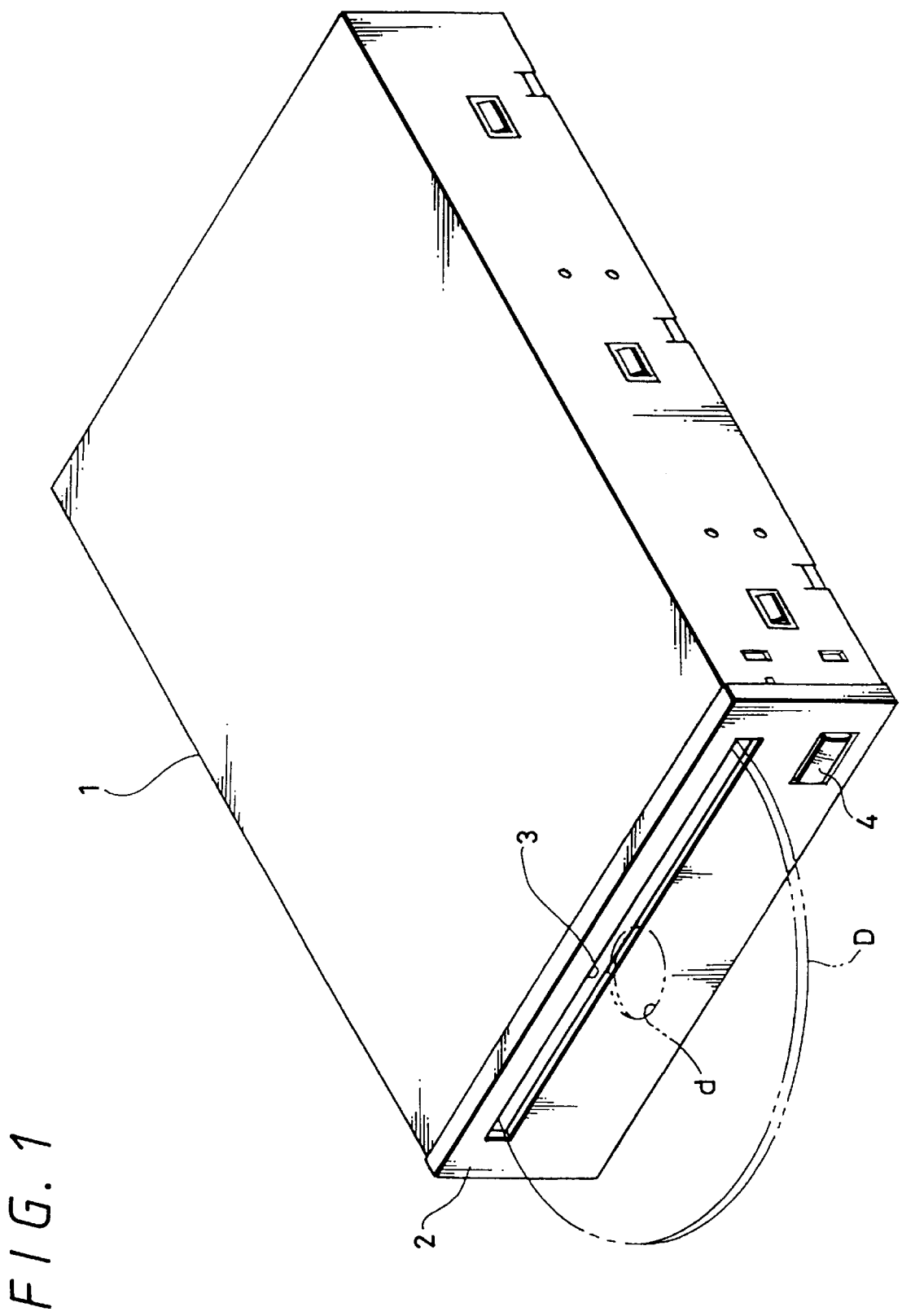
FIG. 1 is an exterior perspective view of an example of a disk recording/reproducing apparatus according to the present invention.

Hereafter, an embodiment of a disk reproducing apparatus according to the present invention will be described by referring to the drawings. Disk recording/reproducing according to this embodiment has been applied to a disk player apparatus for reproducing an information signal recorded on an optical disk representing a concrete example of a disk-like recording medium. Description will be given according to the following sequence.

Figure 15:
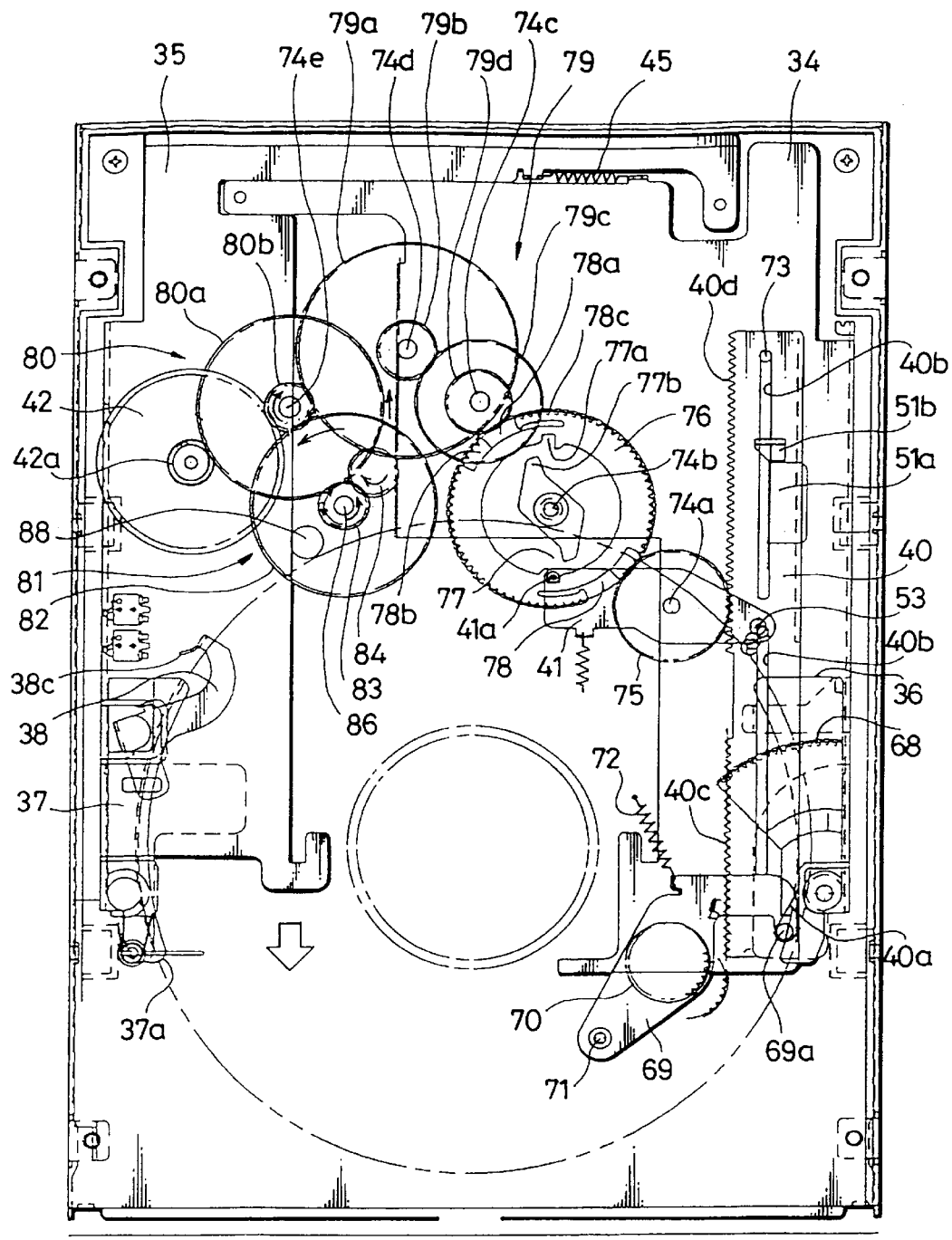
FIG. 15 is a top plan view showing such a state that operation for discharging the optical disk has been started in the disk loading mechanism of the disk recording/reproducing apparatus shown in FIG. 1.
Figure 16:
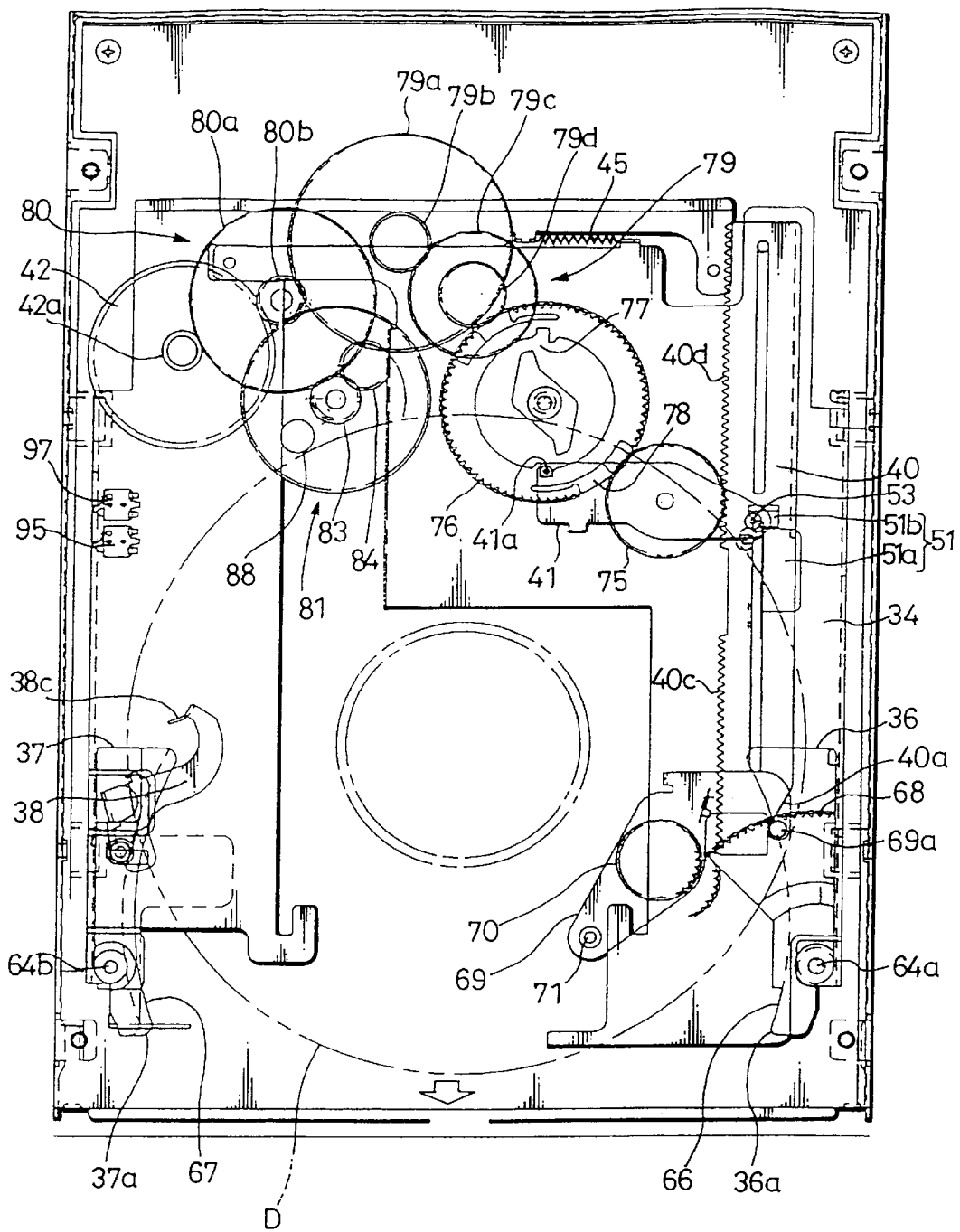
FIG. 16 is a top plan view showing an intermediate state of the optical disk discharge operation in the disk loading mechanism of the disk recording/reproducing apparatus shown in FIG. 1.
Figure 17:
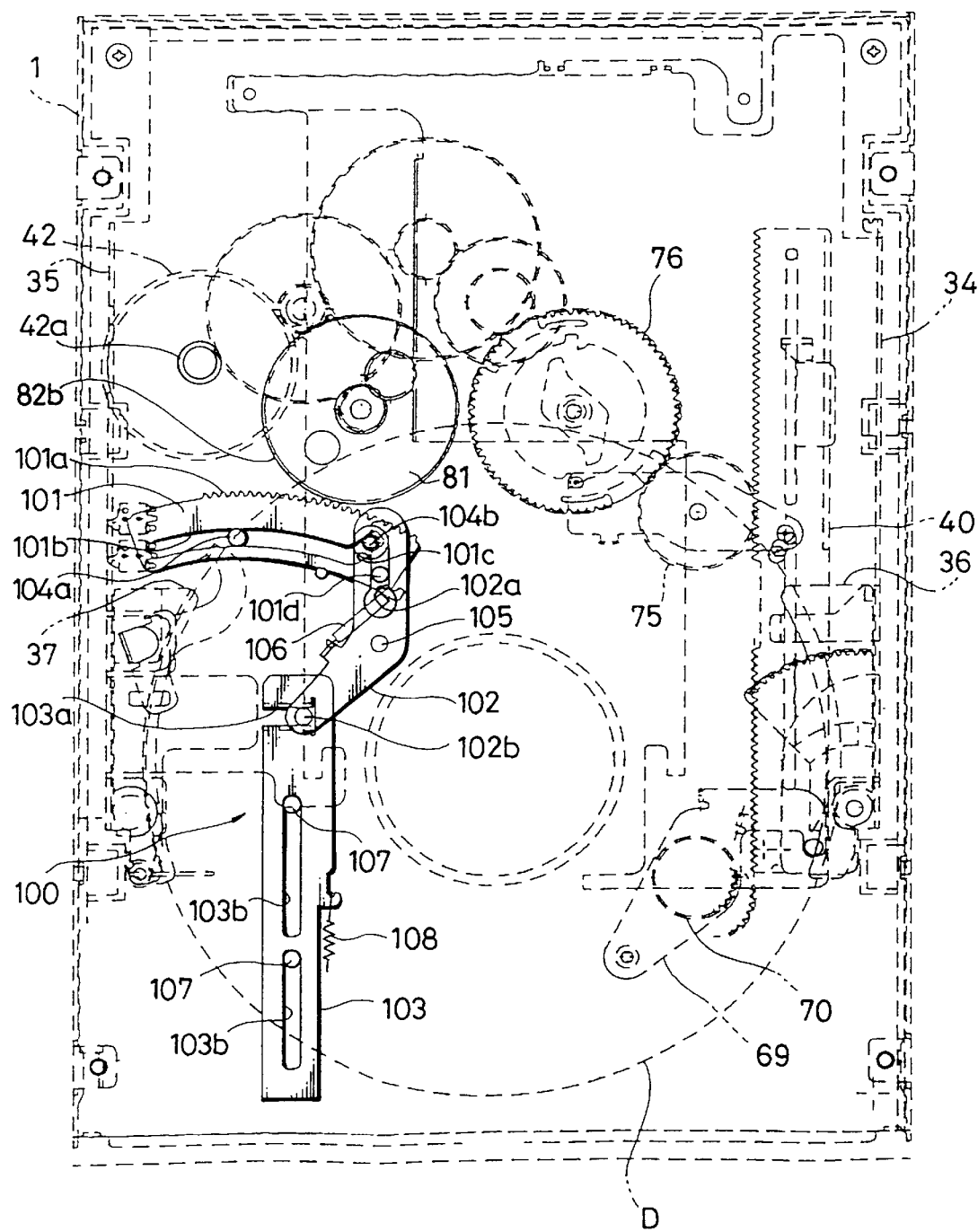
FIG. 17 is a top plan view showing a manual operation mechanism of the disk recording/reproducing apparatus shown in FIG. 1.

[1] Configuration of optical disk (FIG. 1)
[2] Exterior view configuration of disk player apparatus (FIG. 1)
[3] Internal configuration of disk player apparatus
  (3-1) Disk drive and read mechanism (FIG. 2)
  (3-2) Disk loading mechanism (FIGS. 3 through 10)
[4] operation of disk player apparatus
  (4-1) Loading initial state of optical disk (FIG. 11)
  (4-2) Loading operation of optical disk (FIGS. 12 through 14)
  (4-3) Chucking of optical disk (FIGS. 6 and 14)
  (4-4) Eject operation of optical disk (FIGS. 11, 15 and 16)
  (4-5) Manual takeout operation of optical disk (FIG. 17)

[1] Configuration of optical disk (FIG. 1)

An optical disk D has a disk substrate formed so as to take the shape of a disk having a diameter of, for example, approximately 120 mm by using a synthetic resin material, such as, for example, polycarbonate. Through the center portion of this disk substrate, a chucking aperture d having a diameter of, for example, approximately 15 mm is formed. A main surface which is one of surfaces of the disk substrate functions as a signal recording surface. When the disk substrate is molded by injection molding means, pits having minute unevenness are formed on the main surface. The pits correspond to digitized information signals recorded on the optical disk D. On the signal recording surface, a reflective layer made of a metal material such as aluminum is formed.

By using an optical pickup apparatus, the optical disk D is exposed to a light flux focused on the signal recording surface through the disk substrate from the other main surface functioning as a signal read surface. By detecting reflected light generated by the light flux on the signal recording surface, the information signal can be read. The optical disk D is thus formed.

[2] Exterior view configuration of disk player apparatus (FIG. 1)

The disk player apparatus of the present example uses the slot-in system for the optical disk D. The appearance of the apparatus is shown in FIG. 1. This disk player apparatus is formed of an exterior casing 1 and a front panel 2. The exterior casing 1 has such a size as to incorporate therein a disk drive, read mechanism and a disk loading mechanism which will be described later. The exterior casing 1 has an opening on its front side. The front panel 2 is attached to the front opening of the exterior casing 1.

The exterior casing 1 is formed of a cover plate portion and a bottom plate portion. The cover plate portion includes both side surface portions and a back surface portion formed integrally with a top surface portion. The front panel 2 has a disk insertion slot 3. The disk insertion slot 3 has a lateral width slightly larger than the diameter of the optical disk D. The insertion slot 3 has an opening which is long in the horizontal direction and narrow in the vertical direction. Via the disk insertion slot 3, the optical disk D is put into and out of the exterior casing 1. Furthermore, on the front panel 2, an operation button 4 for eject operation is disposed to automatically discharge the optical disk D.

As the material of the exterior casing 2, a steel plate is suitable. As the material of the front panel 3, a synthetic resin such as ABS resin or the like is suitable. However, the exterior casing 2 may be formed by using a synthetic resin material, and the front panel 3 may be formed by using a sheet metal.

Figure 2:
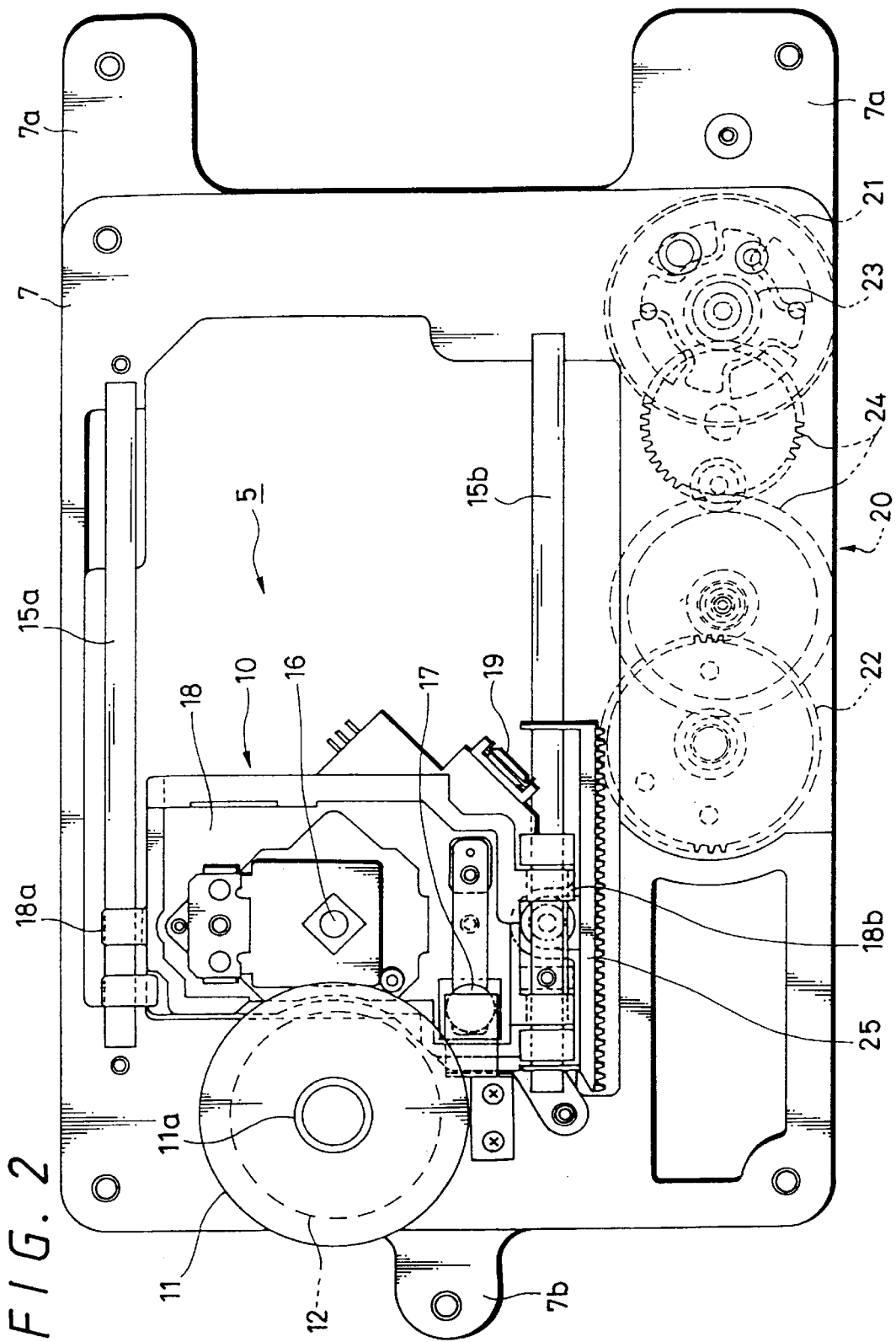
FIG. 2 is a top plan view of an example of a disk drive and read mechanism of the disk recording/reproducing apparatus shown in FIG. 1.

[3] Internal configuration of disk player apparatus
  (3-1) Disk drive and read mechanism (FIG. 2)

The disk player apparatus has a disk drive and read mechanism 5 configured as shown in FIG. 2. The disk drive and read mechanism 5 is attached to a sub-chassis 7. The sub-chassis 7 is supported by a base chassis 6 so as to be able to face upward and face downward. The disk drive and read mechanism 5 is housed within the exterior casing 1 via the base chassis 6. The base chassis 6 is a quadrilateral casing having a shallow bottom. On both sides of the inner part of an opening 6a formed in the top surface of the base chassis 6, a pair of left and right positioning projections 6b are formed to position both ends of the back part of the sub-chassis 7 and support the sub-chassis 7 so as to be able to face upward and face downward (see FIG. 7).

Corresponding to the positioning projections 6b of the base chassis 6, insulator mounting portions 7a and 7a are formed on both sides of the back part of the sub-chassis 7, and an insulator mounting portion 7b is formed in the center of the front part. To each of the insulator mounting portions 7a and 7b, an insulator 8 functioning as a damping member for preventing propagation of vibration generated by an elastic member such as rubber or the like is attached. Insulators 8 attached to the back part of the sub-chassis 7 are coupled to the positioning projections 6b. The insulator 8 attached to the front part of the sub-chassis 7 is attached to an ascent/descent drive lever 9.

As the material of the base chassis 6 and the sub-chassis 7, engineering plastic having high mechanical strength, such as polyacetal or the like, is suitable. As a matter of course, however, other synthetic resin materials can be used. Aluminum alloy, a steel plate or the like may be used.

On the sub-chassis 7, an optical pickup device 10 and a turn table 11 are mounted. The turn table 11 is attached to the tip end of the rotation shaft of a spindle motor 12. The spindle motor 12 is mounted on the front part of the sub-chassis 7. Through the center of the top of the turn table 11, a centering guide 11a for fitting the chucking aperture d of the optical disk D therein is provided. In the center part of the centering guide 11a, a chucking ring 62 for chucking which will be described later is mounted. By this centering guide 11a, the optical disk D is positioned.

At the rear side of the turn table 11, the optical pickup device 10 is adapted to move forward and backward, i.e., get near and go away from the turn table 11 along a pair of left and right guide shafts 15a and 15b disposed on the sub-chassis 7. Two guide shafts 15a and 15b are made parallel to each other and are supported by and fixed to the sub-chassis 7 at both ends thereof.

The optical pickup device 10 has a carriage 18. On the carriage 18, an objective lens 16 and a skew sensor 17 are mounted thereof upward. Into bearing portions 18a and 18b formed at both ends of the carriage 18, the pair of guide shafts 15a and 15b are inserted so as to be slidable. Furthermore, on the side surface of the carriage 18, an optical block 19 for transmitting/receiving a laser beam to/from the objective lens 16 is mounted. The skew sensor 17 is a detector for detecting an inclination of the main surface of the optical disk D and making the objective lens 16 follow the detected inclination.

In order to move the optical pickup device 10 toward/away from the turn table 11, a carriage moving mechanism 20 is disposed on the sub-chassis 7. As shown in FIG. 2, the carriage moving mechanism 20 includes a carriage drive motor 21 fixed to the sub-chassis 7, a drive gear 22 driven by the carriage drive motor 21 to rotate in the forward or backward direction, a gear train 24 for coupling the drive gear 22 to an output gear 23 attached to a rotation shaft of the carriage drive motor 21 so as to transmit power, and a rack 25 mounted on one side surface of the carriage 18 and engaged with the drive gear 22 and so on.

In this way, the drive gear 22 rotated in the forward or backward direction via the gear train 24 having a combination of a plurality of gears drives linearly the rack 25. As a result, the carriage 18 is guided by the pair of guide shafts 15a and 15b and moved forward or backward.

(3-2) Disk loading mechanism (FIGS. 3 through 10)

In correspondence to the above described disk drive and read mechanism 5, the disk player apparatus has a disk loading mechanism 30. The disk loading mechanism 30 functions to load/unload the optical disk D onto/from the disk drive/read mechanism 5. The disk loading mechanism 30 is disposed on the interior surface side of a top chassis 31 mounted on the top surface side of the base chassis 6. A cam lever 32 and a gear lever 33 forming a part of the disk loading mechanism 30 are mounted on the top surface of the base chassis 6 so as to be rotatable. The cam lever 32 and the gear lever 33 will be described later.

In the present example, the top chassis 31 is formed by a sheet metal. In the same way as the base chassis 6, however, the top chassis 31 may be molded by engineering plastic, such as polyacetal or the like, having large mechanical strength. As shown in FIGS. 3 through 6, the top chassis 31 is formed so as to take the shape of a flat plate having nearly the same size as the base chassis 6 when seen from the top. By screwing the top chassis 31 to a plurality of mounting legs 6c formed on the top surface of the base chassis 6, the top chassis 31 is fixed to the base chassis 6.

The disk loading mechanism 30 disposed on the interior surface side of the top chassis 31 includes a pair of left and right holder plates 34 and 35, a pair of left and right disk holders 36 and 37, an eject arm 38, an eject lever 39, a rack plate 40, a cam lever 41, a loading motor 42, a loading gear train 43, an unloading gear train 44 and so on.

Figure 4:
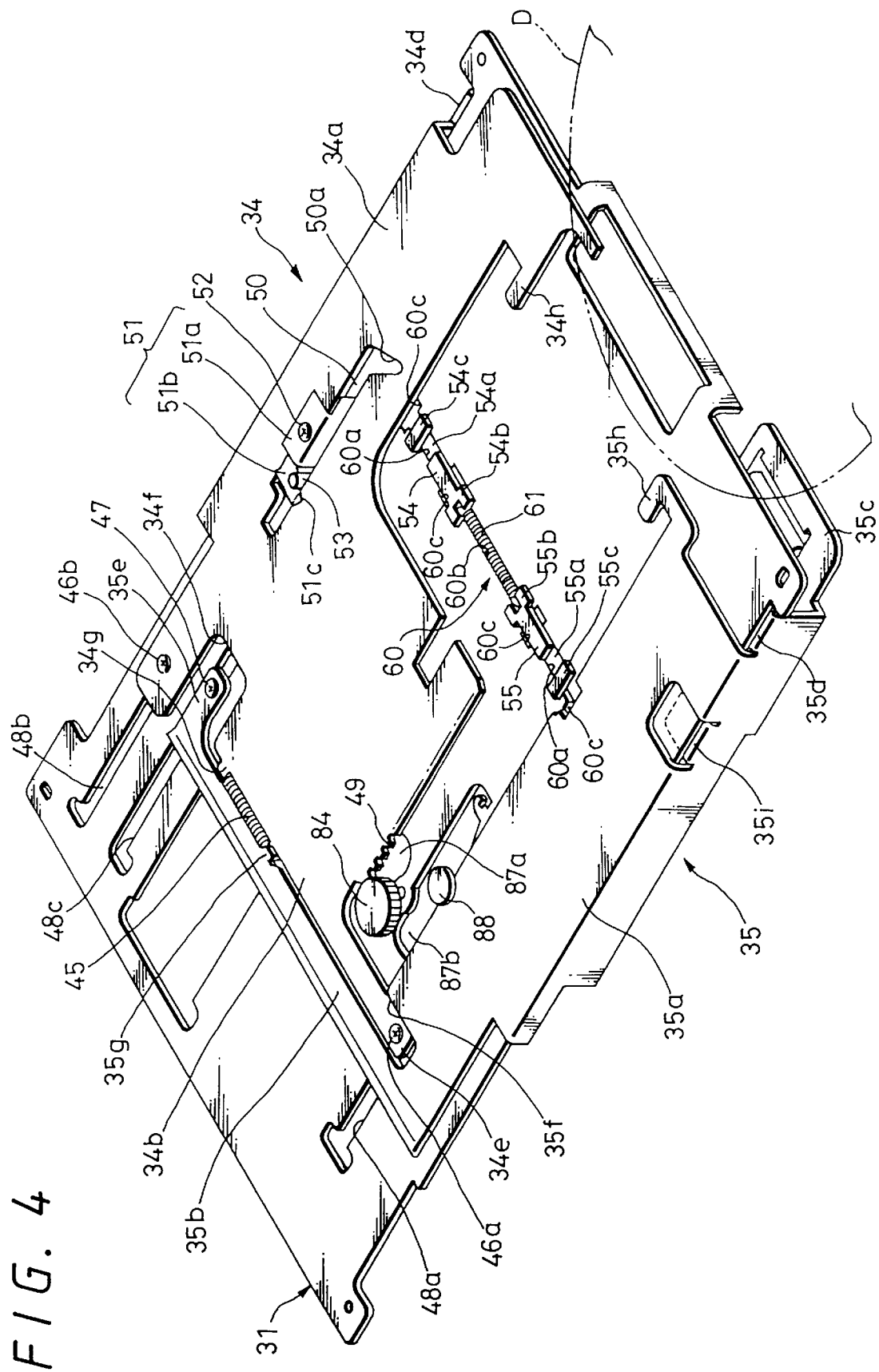
FIG. 4 is a top a perspective view of an example of the top chassis of the disk recording/reproducing apparatus shown in FIG. 1.

As shown in FIG. 4, the pair of left and right holder plates 34 and 35 include main surface portions 34a and 35a extending in the disk insertion direction, i.e., the forward/backward direction, horizontal side portions 34b and 35b respectively projected inward in the inner parts of the main surface portions 34a and 35a so as to be opposed to each other, support portions 34c and 35c having "L" shaped sections and projecting inward in positions slightly displaced backward from the front tip end portions, and support pieces 34d and 35d formed by bending the holder plates so as to form predetermined gaps between them and the support portions 34c and 34c. The top chassis 31 is inserted between the support pieces 34d and 35d and the main surface portions 34a and 34b coplanar with the horizontal side portions 34b and 35b.

The horizontal side portion 34b of the first holder plate 34 is formed on the inside of the horizontal side portion 35b of the second holder plate 35. In the back end portion of the main surface portion 34a of the first holder plate 34, a notch 34f is formed to avoid interference with a forward-facing convex portion 35e formed in a tip end portion of the horizontal side portion 35b of the second holder plate 35. In a back part of the main surface portion 35a of the second holder plate 35, a notch 35f is formed. A tip end of the horizontal side portion 34b of the first holder plate 34 is coupled to the notch 35f. On mutually opposed sides of the horizontal side portions 34b and 35b, spring bearing pieces 34g and 35g are formed. Between the spring bearing pieces 34g and 35g, a coil spring 45 is stretched. The coil spring 45 represents a concrete example of an energizing member. By spring force of the coil spring 45, the pair of holder plates 34 and 35 are energized mutually inward so as to laterally sandwich the top chassis 31 between them.

Guide pins 46a, 46b and 47 are fixed to both ends of the horizontal side portion 34b of the first holder plate 34 and the forward-facing convex portion 35e of the second holder plate 35, respectively. Tip ends of the guide pins 46a, 46b and 47 are slidably engaged with guide grooves 48a, 48b and 48c formed through the top chassis 31. The guide grooves 48a, 48b and 48c extend in the forward/backward direction, and they are made parallel to each other.

The base portion of the horizontal side portion 34b of the first holder plate 34 projects forward. On an edge of this projection on the second holder plate 35 side, a rack portion 49 extending in the forward/backward direction is formed. This rack portion 49 is made parallel to the guide grooves 48a and the like. A guide groove 50 extending in the forward/backward direction in parallel to the rack portion 49 is formed in an intermediate portion of the main surface portion 34a of the first holder plate 34. A plate spring 51 is mounted in the guide groove 50. The plate spring 51 represents a concrete example of a biasing member.

The plate spring 51 has a fixed portion 51a formed so as to have a L-shaped section and an operation portion 51b continuous to one side of the fixed portion 51a. In such a state that the fixed portion 51a is laid along one side edge of the guide groove 50, the fixed portion 51a is fastened and fixed to the holder plate 34 by a set screw 52. The operation portion 51b of the plate spring 51 overhang the guide groove 50. On a front edge portion thereof, a pin operation portion 51c having an inclined surface is formed. The inclined surface functions to press an operation pin 53 sliding in the guide groove 50 to thereby swing the cam lever 32 which will be described later. In order to assure the movement of the operation pin 53 in the lateral direction caused by the pin operation portion 51c, an escape portion 50a continuing to inside is formed in the front part of the guide groove 50.

Figure 6:
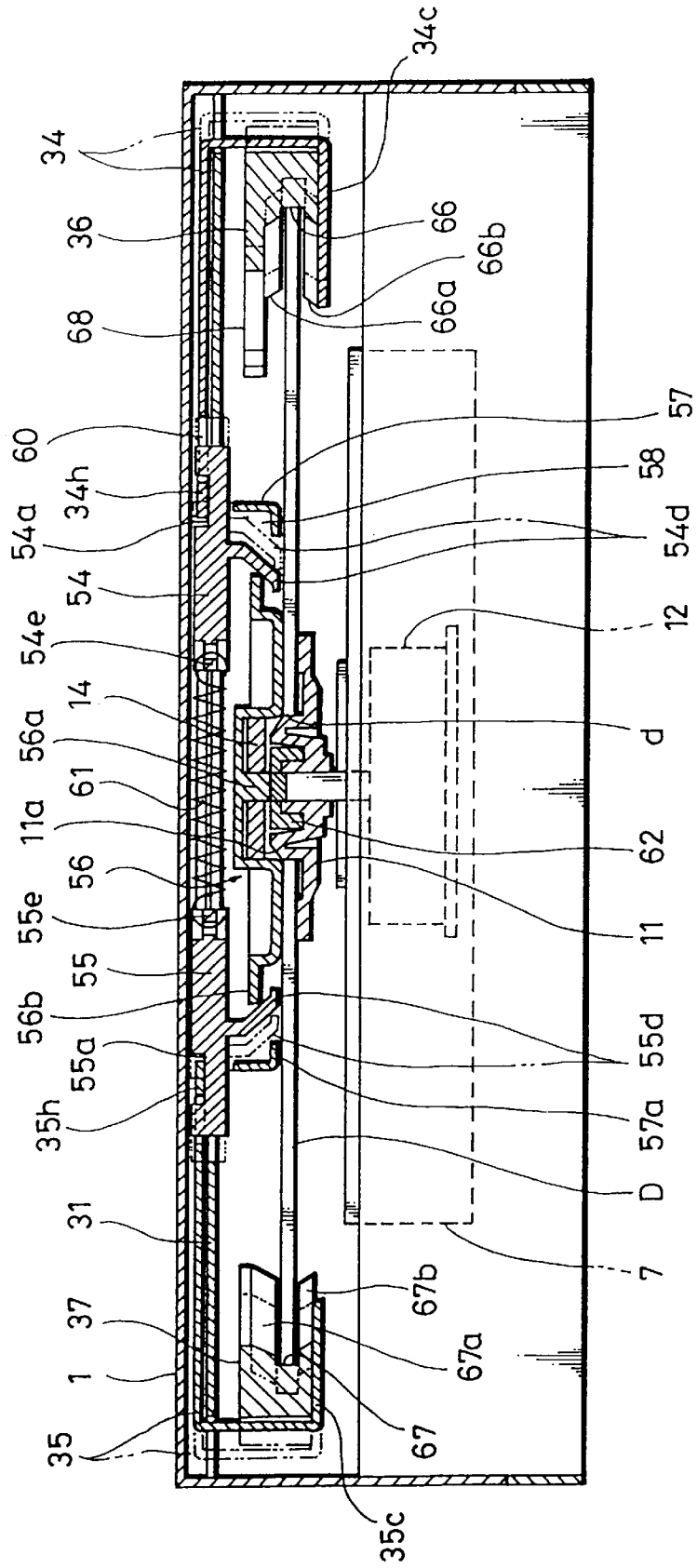
FIG. 6 is a sectional view of the disk recording/reproducing apparatus shown in FIG. 1 in the chucking operation state of an optical disk conducted by the disk drive and read mechanism, and a disk loading mechanism.

At positions slightly displaced backward from the front end portions of the main surface portions 34a and 35a of the holder plates 34 and 35, L-shaped hook portions 34h and 35h projecting backward are formed. When the holder plates 34 and 35 are moved backward for loading, the hook portions 34h and 35h are coupled to catch grooves 54a and 55a of a pair of pulley catches 54 and 55, respectively. By an outward movement of the holder plates 34 and 35 caused by the next operation, the pulley catches 54 and 55 as represented by solid lines in FIG. 6 are moved respectively outward as represented by two-dot chain lines. As a result, holding of a chucking member 56 is released.

The chucking member 56 is supported so as to be rotatable in a pulley housing portion 58 of a pulley cover 57 attached to a center portion of the lower surface of the top chassis 31. The pulley cover 57 is formed by a thin casing taking a rectangular shape in the front part and a semicircular shape in the back part and opening on one surface side. By partitioning the inside of the back part so as to become circular, the pulley housing portion 58 is formed therein. On the side opposite to the opening side of the pulley housing portion 58, a circular opening is formed. Thereby, an inward flange portion 57a is formed.

At both side portions in the lateral direction perpendicular to the disk insertion direction of the pulley housing portion of the pulley cover 57, expanding portions 57b respectively expanding outward are formed. At the portions of the flange portion 57a located inside the respective expanding portions 57b, notches 57c are formed, respectively. In the pulley housing portion 58 having such configuration, the chucking member 56 is housed so as to have gaps of some degree in the diameter direction and the vertical direction. So as to correspond to the left and right expanding portions 57b of the pulley cover 57, a guide groove 60 extending in the lateral direction is formed through the top chassis 31 so as to have a center portion coincident with the center of the expanding portions 57b.

The guide groove 60 has catch slide portions 60a and 60a disposed on both outsides in the lateral direction, and a communication portion 60b for communicating both the catch slide portions 60a and 60a. In the respective catch slide portions 60a, passage holes 60c for passing falling-off preventing flange portions 54b and 55b of the pulley catches 54 and 55 are formed. As shown in FIGS. 3 through 6, the pair of left and right pulley catches 54 and 55 made of the same members for sandwiching the chucking member 56 between them and supporting the chucking member 56 are engaged to the guide groove 60 so as to be slidable in the lateral direction.

The pair of pulley catches 54 and 55 are each formed by a rectangular block coupled to the catch slide portions 60a of the guide groove 60. In upper parts of the inside and the outside of the rectangular blocks, the flange portions 54b, 54c, and 55b, 55c are formed to prevent the blocks from falling off toward the lower surface side. In the center portion of the lower surface, nail portions 54d and 55d for sandwiching the chucking member 56 between them are formed, respectively. The nail portions 54d and 55d of the pulley catches 54 and 55 are respectively formed so as to be bent toward the chucking member 56 in order to sandwich the chucking member 56 between them. In order to prevent the nail portions from falling off toward the upper surface side and support the chucking member 56 stably, the nail portions 54d and 55d are formed so as to have widths wider than the dimensions of the passage holes 60c of the guide groove 60.

At internal ends of the respective pulley catches 54 and 55, spring receiving portions 54e and 55e are formed so as to be opposed to each other. Between the spring receiving portions 54e and 55e, a coil spring 61 is stretched. The coil spring 61 represents a concrete example of the biasing member. By spring force of the coil spring 61, the pair of pulley catches 54 and 55 are based mutually inward so as to sandwich the chucking member 56 between them in the lateral direction. Inward movements of the respective pulley catches 54 and 55 are restricted by internal edges of the catch slide portions 60a of the guide groove 60.

As materials of the pulley catches 54 and 55 and the pulley cover 57, the ABS resin, for example, is suitable. As a matter of course, however, other synthetic resin materials can be used. Or a metal material such as an aluminum alloy or the like may be used.

As shown in FIG. 6, the chucking member 56 gripped by between the pulley catches 54 and 55 is formed by a disk-shaped member having a positioning shaft portion 56a projected downward at the central portion thereof. By expanding the central portion upward, a ring-shaped space portion is formed around the positioning shaft portion 56a. In the space portion, a ring-shaped magnet 14 is inserted and fixed. By magnetic force of the magnet 14, the chucking member 56 is attracted to the turn table 11 side.

At the time of loading, a centering guide 11a of the turn table 11 is inserted into the space portion of the chucking member 56. Thereby, positioning of the optical disk D with respect to the turn table 11 is conducted. In order to positively exert the magnetic force of the magnet 14 of the chucking member 56 or the turn table 11, a ring-shaped recess portion is formed in the central portion of the turn table 11. In the recess portion, a chucking ring 62 made of iron is fixed. The iron represents an example of a magnetic substance.

Inside a support portion 34c of the first holder plate 34, the first disk holder 36 is supported in its front part by a fulcrum shaft 64a so as to be rotatable in the horizontal direction. The first disk holder 36 represents a concrete example of the pair of disk sandwich members On the contrary, the second disk holder 37, which is a concrete example of the pair of disk sandwich members, is supported in its front part by a fulcrum shaft 64b so as to be rotatable in the horizontal direction inside a support portion 35c of the second holder plate 35. By torsion springs 65a and 65b loosely coupled to the fulcrum shafts 64a and 64b, the disk holders 36 and 37 are biased outward. In other words, the first disk holder 36 is biased in the clockwise direction, and the second disk holder 37 is biased in the counterclockwise direction in FIG. 11. The disk holders 36 and 37 represent a concrete example of energizing members loosely coupled to the fulcrum shafts 64a and 64b.

On the interior surface sides of the pair of disk holders 36 and 37, holding grooves 66 and 67 are formed to hold the outer peripheral edge which is the outer circumference of the optical disk D. Each of the holding grooves 66 and 67 takes the shape of a circular arc curved on the concave side. Each of the holding grooves 66 and 67 has nearly the same radius of curvature as the peripheral edge of the optical disk D. As shown in FIG. 6, inward inclined taper surfaces 66a, 66b, and 67a, 67b are formed on both sides of the holding grooves 66 and 67 in the groove width direction to guide the peripheral edge of the optical disk D into the central holding grooves 66 and 67. It is preferred to set the inclination angle of the tapered surfaces 66a, 66b, 67a and 67b equal to nearly 60 degrees with respect to the plane direction of the optical disk D. So long as the inclined surfaces can guide the peripheral edge of the optical disk D, however, the inclination angle is not restricted to this value.

Figure 13:
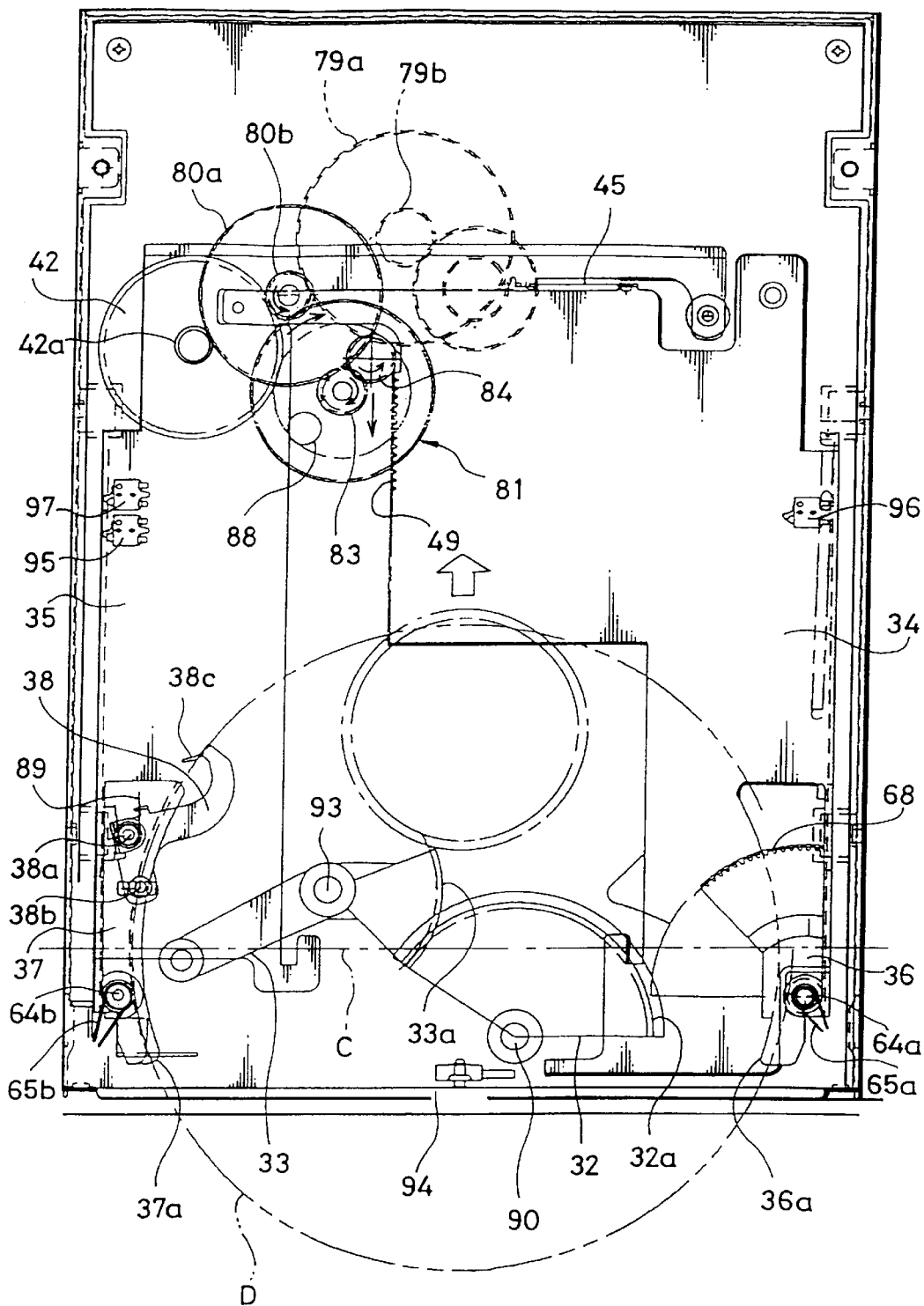
FIG. 13 is a top plan view showing an intermediate state of the optical disk insertion operation in the disk loading mechanism of the disk recording/reproducing apparatus shown in FIG. 1.

The centers of rotation of the disk holders 36 and 37 with the fulcrum shafts 64a and 64b are set on the front side with respect to a center C of the holding grooves 66 and 67 whereat the diameter of the optical disk D becomes the greatest (see FIG. 13). On the front side of the fulcrum shaft 64a of the first disk holder 36, therefore, a chin-shaped restriction portion 36a for restricting the runaway of the optical disk D is set. On the front side of the fulcrum shaft 64b of the second disk holder 37, a chin-shaped input portion 37a is set to resist the biasing force of a torsion spring 65b to rotate the disk holder 37 by using the insertion force of the optical disk D.

In the first disk holder 36, a fan-shaped gear 68 having the fulcrum shaft 64b as the gear center is formed integrally with the first disk holder 36. The fan-shaped gear 68 is provided above the tapered surface 66a, which is in turn formed above the holding groove 66. The gear portion of the fan-shaped gear 68 is disposed on the back part side. The fan-shaped gear 68 can engage with a holder drive gear 70 supported in the center part of an eject lever 69 so as to be rotatable. In the normal state, the fan-shaped gear 68 and the holder drive gear 70 are held in such a state that they do not mesh with each other.

Figure 11:
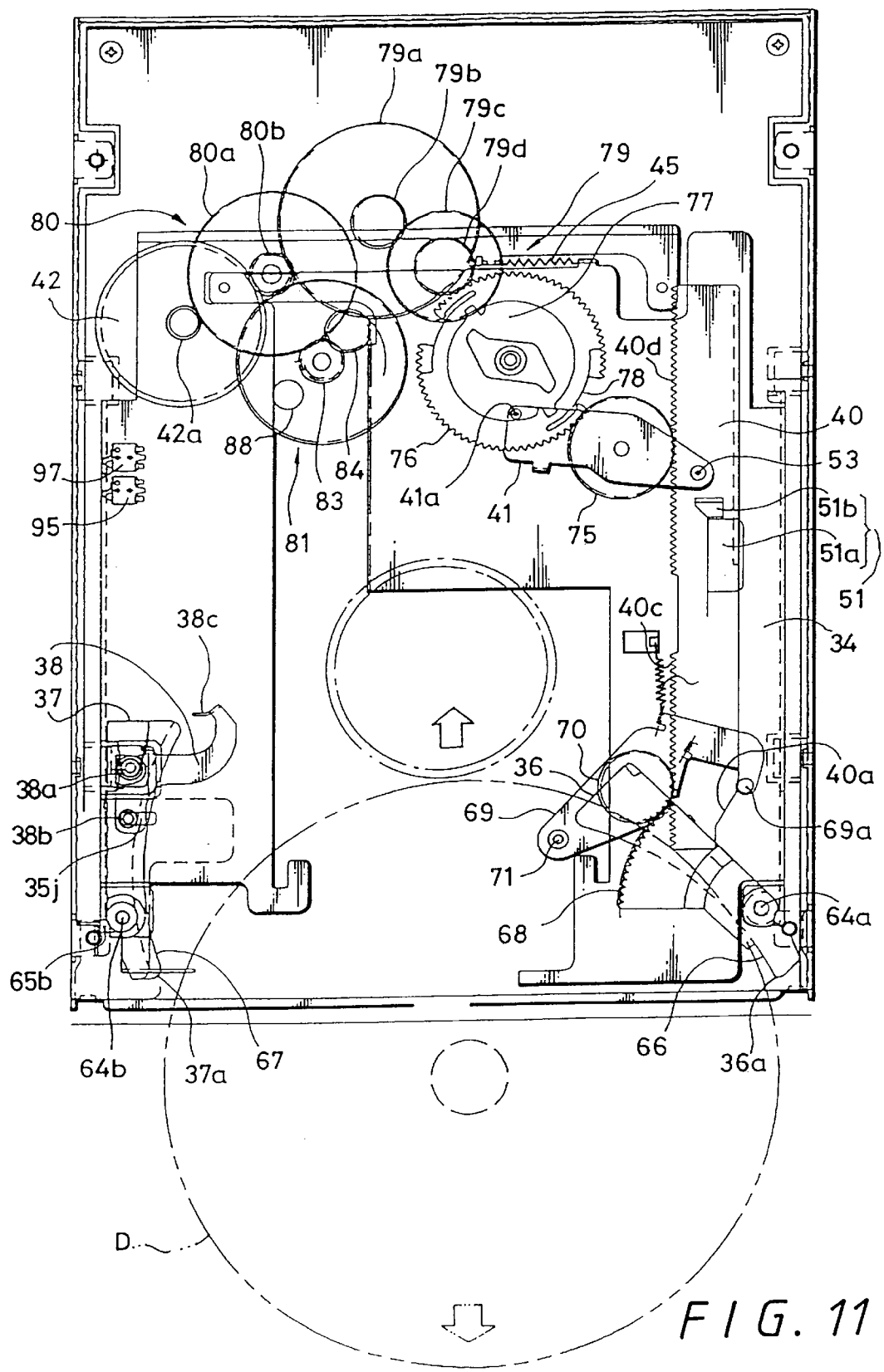
FIG. 11 is a top plan view showing the initial state of the disk loading mechanism of the disk recording/reproducing apparatus shown in FIG. 1.

As shown in FIG. 11, a base end portion of the eject lever 69 supporting the holder drive gear 70 is supported by a rotation shaft 71 so as to be rotatable with respect to the top chassis 31. To a tip end portion of the eject lever 69 projecting to the opposite side of the holder drive gear 70 from the end portion, a cam pin 69a is fixed. Between the eject lever 69 and the top chassis 31, a coil spring 72 functioning as a biasing member is stretched. By spring force of the coil spring 72, the holder drive gear 70 is biased in such a direction as to leave the fan-shaped gear 68. By the spring force of the coil spring 72, the cam pin 69a is brought into contact with a cam portion 40a of the rack plate 40 so as to be slidable.

The rack plate 40 has a guide groove 40b extending in the forward/backward direction. Via a plurality of stepped pins 73 coupled to the guide groove 40b so as to be slidable, the rack plate 40 is supported by the top chassis 31 so as to be slidable in the forward/backward direction. In the front edge part of the outer side of the rack plate 40, the cam portion 40a is formed. In the front part and the back part of the inner edge of the rack plate 40, front and back rack portions 40c and 40d having continuous teeth are formed. By sliding the cam pin 69a along the cam portion 40a of the rack plate 40, the eject lever 60 is rotated around the rotation shaft 71. The holder drive gear 70 thus engages with the front rack portion 40c of the rack plate 40 and the fan-shaped gear 68 of the disk holder 36.

A rack drive gear 75 supported by a fulcrum shaft 74a so as to be slidable with respect to the top chassis 31 always engages with the back rack portion 40d of the rack plate 40. In the rack drive gear 75, the cam lever 41 is formed integrally therewith. To the tip end portion of the cam lever 41 located on the rack plate 40 side, the above described operation pin 53 is fixed. To the tip end portion of the cam lever 41 located on the side opposite to the rack plate 40, a cam pin 41a is fixed. The cam pin 41a is coupled to a cam portion 77 of a cam gear 76, which is supported by a support shaft 74b so as to be rotatable with respect to the top chassis 31.

Figure 5:
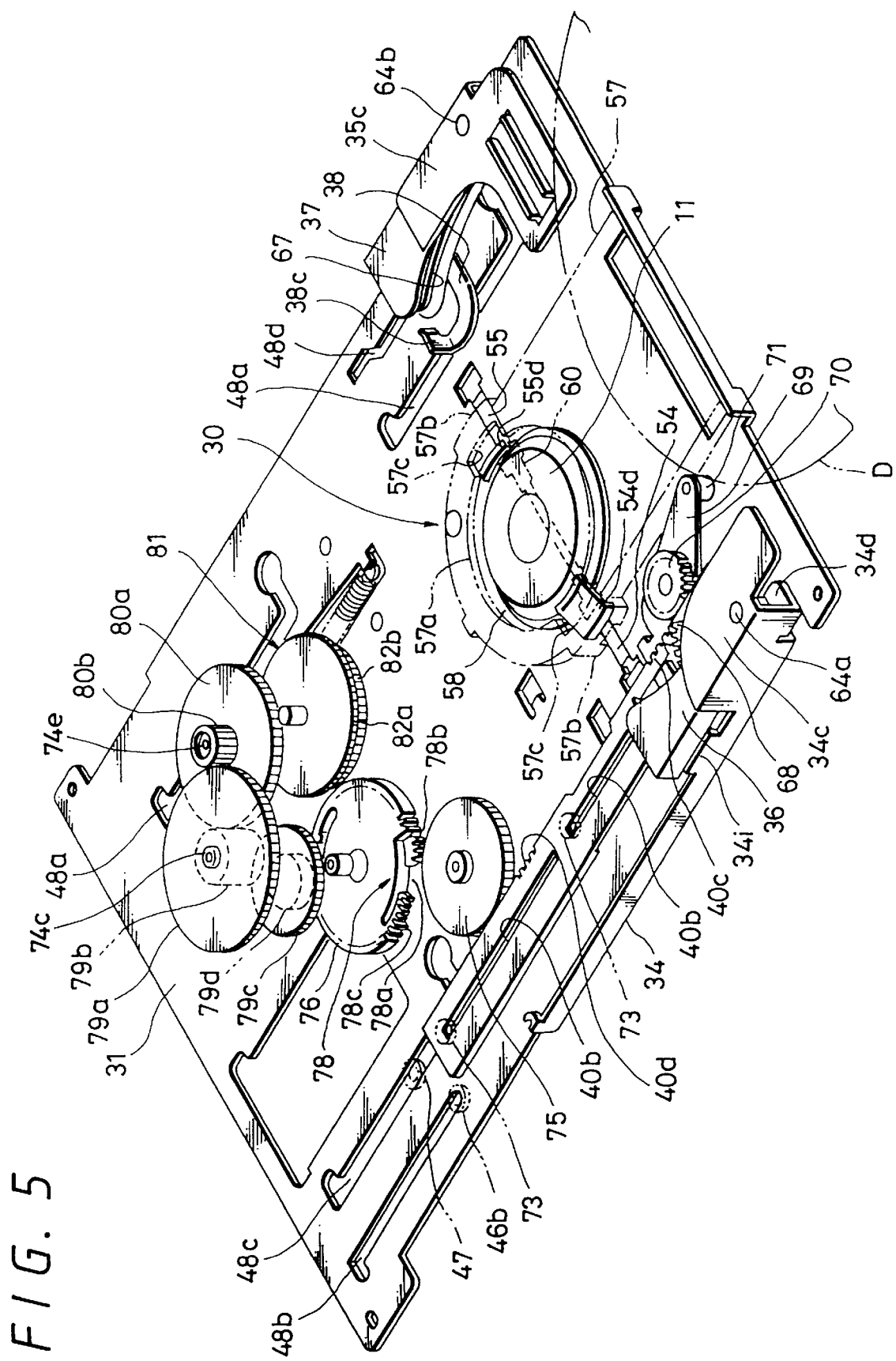
FIG. 5 is a lower perspective view of an example of the top chassis of the disk recording/reproducing apparatus shown in FIG. 1.
Figure 10:
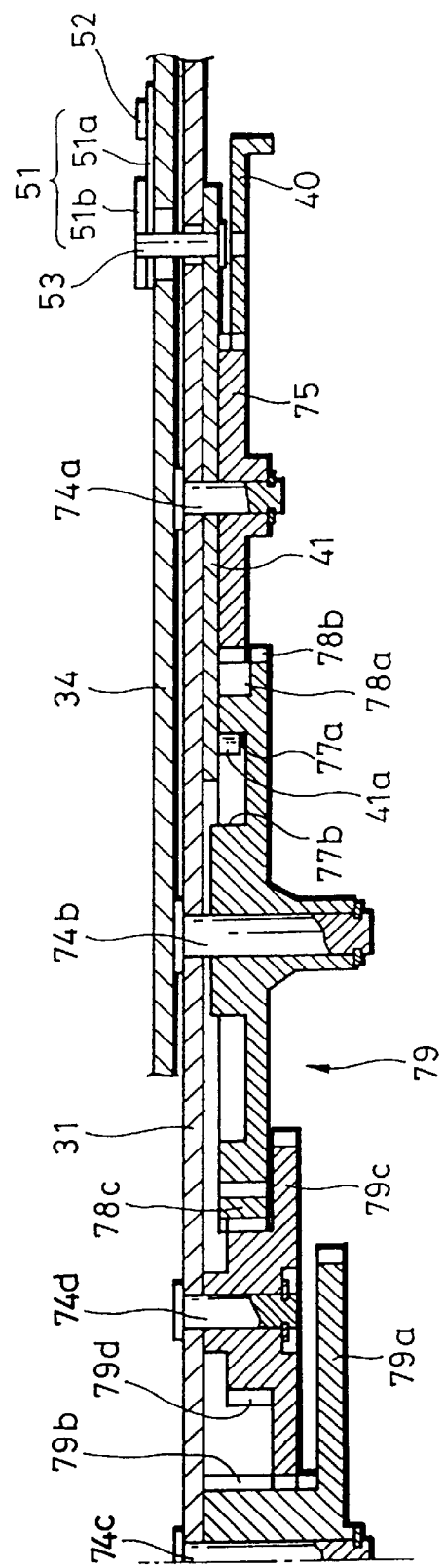
FIG. 10 is a sectional view of a train of unloading gears of the disk recording/reproducing apparatus shown in FIG. 1.

As shown in FIGS. 5 and 10 or the like, the cam gear 76 has two cam portions 77 formed by denting a radially inner part of one surface side, and two gear portions 78 formed on the peripheral surface. The cam gear 76 takes such a symmetric shape as to be obtained by rotation of 180 degrees with the rotation center taken as the center of point symmetry. Each cam portion 77 has a coupling concave portion 77a dented radially outward and formed on the radially outside and a coupling convex portion 77b formed on the radially inside so as to correspond to the coupling concave portion 77a. Between the coupling concave portion 77a and the coupling convex portion 77b, the cam pin 41a is held so as to be mountable and demountable.

In the gear portion 78 of the cam gear 76, a notch portion 78a for cutting off the continuity in the circumferential direction is formed. On one side of the notch portion 78a in the circumferential direction, a thin teeth portion 78b made thinner in tooth width than the other portion is formed. On the other side of the notch portion 78a in the circumferential direction, an elastic teeth portion 78c wholly provided with elasticity by forming grooves extending in the circumferential direction is provided. The rack drive gear 75 and a terminal intermediate gear 79d of an unloading gear train 79 engage with the gear portion 78 of the cam gear 76.

The unloading gear train 79 includes the rack drive gear 75, the cam gear 76, and four intermediate gears 79a through 79d. The intermediate gear 79a is formed integrally with the intermediate gear 79b. The intermediate gear 79c is formed integrally with the intermediate gear 79d. The intermediate gears 79a and 79b and the intermediate gears 79c and 79d are supported by the top chassis 31 respectively via support shafts 74c and 74d so as to be rotatable.

An intermediate gear 80b of a loading gear train 80 engages with the beginning intermediate gear 79a of the unloading gear train 79. The loading gear train 80 includes an output gear 42a, two intermediate gears 80a and 80b, and an epicyclic gear 81. The output gear 42a is attached to a rotation shaft of the loading motor 42 fixed to the top chassis 31. The two intermediate gears 80a and 80b are formed integrally and supported by the top chassis 31 via a support shaft 74e so as to be rotatable. The intermediate gear 80a engages with the output gear 42*a*. An external gear wheel 82*a* of the epicyclic gear 81 engages with the intermediate gear 80*b*.

The epicyclic gear 81 includes an external large gear 82*a* and an external small gear 82*b* formed by uneven double gear on the periphery, a sun gear 83 formed so as to be integral with the external gear wheel 82*a* and the external pinion 82*b* and have the same rotation center as the external gear wheel 82*a* and the external pinion 82*b*, a planet gear 84 engaging with the sun gear 83, and a rotating plate 85 for supporting the planet gear 84 via a shaft so as to be rotatable. The external large gear 82*a*, the external small gear 82*b*, the sun gear 83, and the rotating plate 85 are supported by a support shaft 86 passing through center parts of them so as to be rotatable with respect to the top chassis 31.

The planet gear 84 is supported by a support shaft 85*c* so as to be rotatable. The support shaft 85*c* is caulked to a support portion 85*a* which is projected from the central part of the rotation plate 85 to one side. An upper part of the planet gear 84 passes through a circular arc groove 87*a* and projects above the top chassis 31. The circular arc groove 87*a* is formed in the top chassis 31 to continue in a circular arc form. The upper part of the planet gear 84 is located slightly backward as compared with the back end of the rack portion of the first holder plate 34. To a support portion 85*b* projected from the central part of the rotation plate 85 to the other side, an operation pin 88 is caulked. The operation pin 88 passes through an opening 87*b* formed in the top chassis 31 and projects above the top chassis 31. By the above described coil spring 45, the inner edge of the second holder plate 35 is biased toward the operation pin 88.

On the lower surface side of the second holder plate 35, the eject arm 38 is mounted so as to be located slightly backward as compared with the disk holder 37. Therefore, a support piece 35*i* bent inward is formed in the holder plate 35. The base of the eject arm 38 nearly taking the shape of "L" is supported by the support piece 35*i* via a support pin 38*a* so as to be rotatable.

The eject arm 38 is held in such a state that its short piece side is directed forward and its long piece side is projected inward. The eject arm 38 is biased forward by a coil spring 89 functioning as a biasing member. To the short piece side of the eject arm 38, an operation pin 38*b* passing through the short piece in the vertical direction is fixed. An upper end portion of the operation pin 38*b* is coupled to a guide groove 35*j* so as to be slidable. The guide groove 35*j* has been formed in the holder plate 35 so as to extend in the lateral direction. A lower end portion of the operation pin 38*b* is coupled to a guide groove 48*d* so as to be slidable. The guide groove 48*d* has been formed in the top chassis 31 so as to extend in the forward/backward direction.

In a tip end portion of the long piece side of the eject arm 38, an operation pin 38*c* is formed. The operation pin 38*c* is projected onto a moving locus of the optical disk D which is being loaded. When the optical disk D is sandwiched between the pair of left and right disk holders 36 and 37, the operation pin 38*c* is biased by the peripheral edge of the optical disk D in such a state that the operation pin 38*c* is rotated slightly backward against the biasing force of the coil spring 89 as shown in FIG. 13. As a result, the optical disk D is sandwiched between the disk holder 36 and the operation pin 38*c* together with the disk holder 37.

Figure 7:
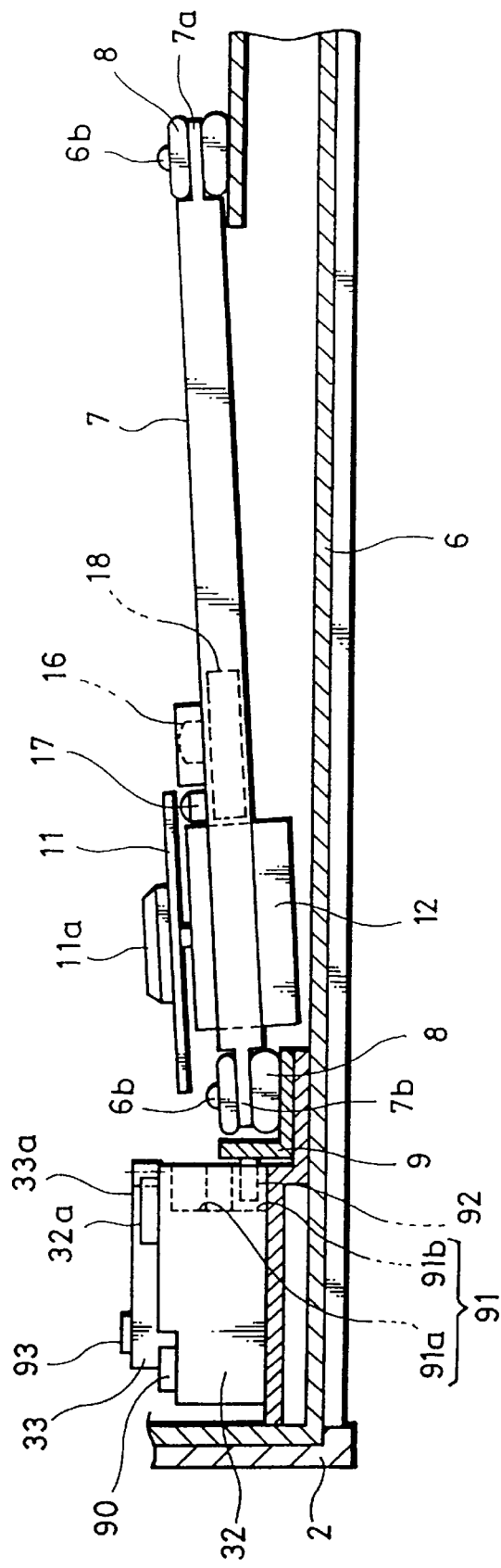
FIG. 7 is a side sectional view of the disk recording/reproducing apparatus shown in FIG. 1 in a disk eject state.
Figure 12:
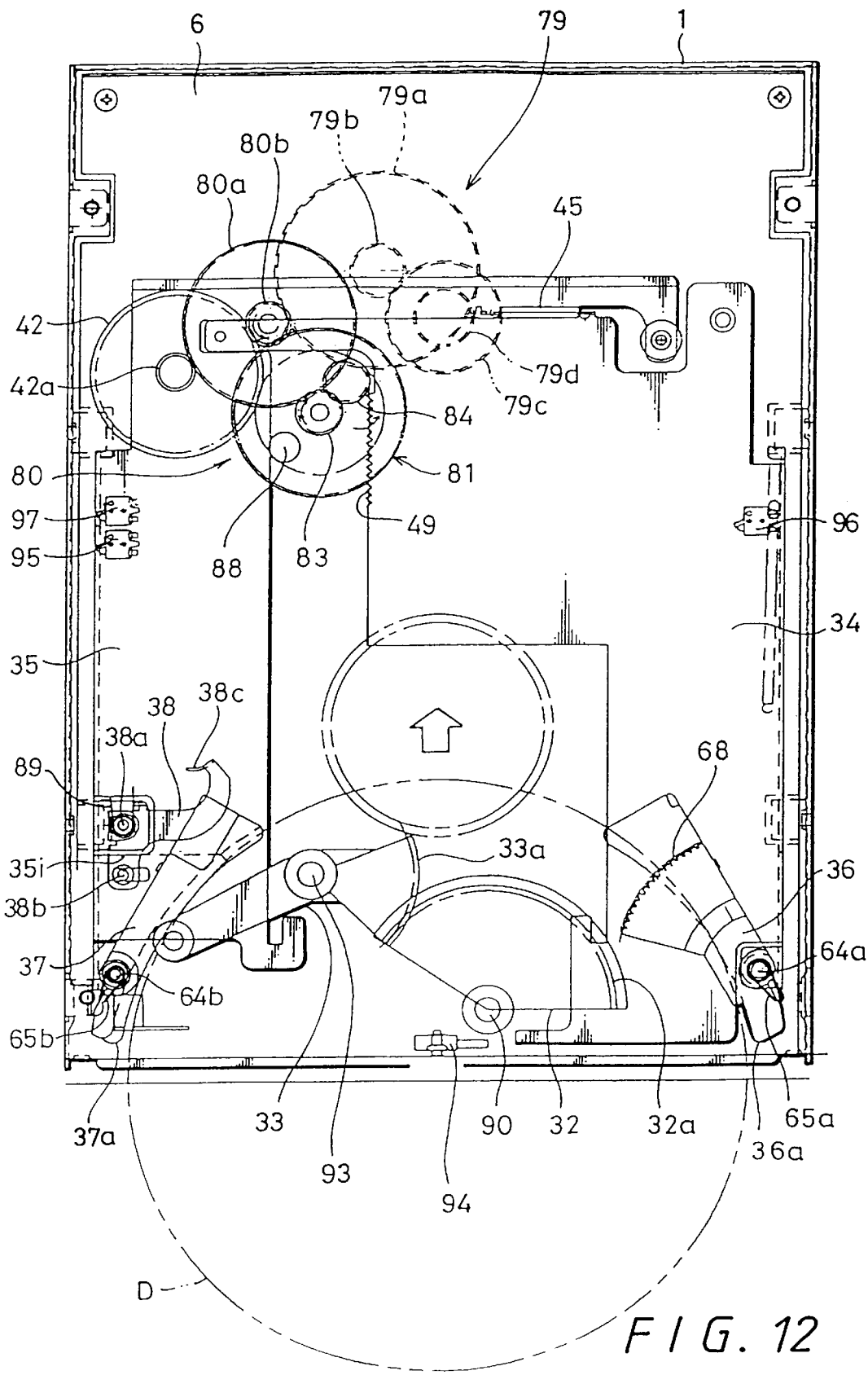
FIG. 12 is a top plan view showing such a state that operation for inserting the optical disk has been started in the disk loading mechanism of the disk recording/reproducing apparatus shown in FIG. 1.

In order to make the sub-chassis 7 face upward/downward in the vertical direction, the cam lever 32 and the gear lever 33 are mounted on the upper surface of the front part of the base chassis 6 so as to be rotatable as shown in FIGS. 7 and 12 or the like. It is made possible for the cam lever 32 to conduct an oscillating movement by a fulcrum shaft 90 erected on the base chassis 6. On a rear surface facing the sub-chassis 7, a cam groove 91 is formed.

Figure 8:
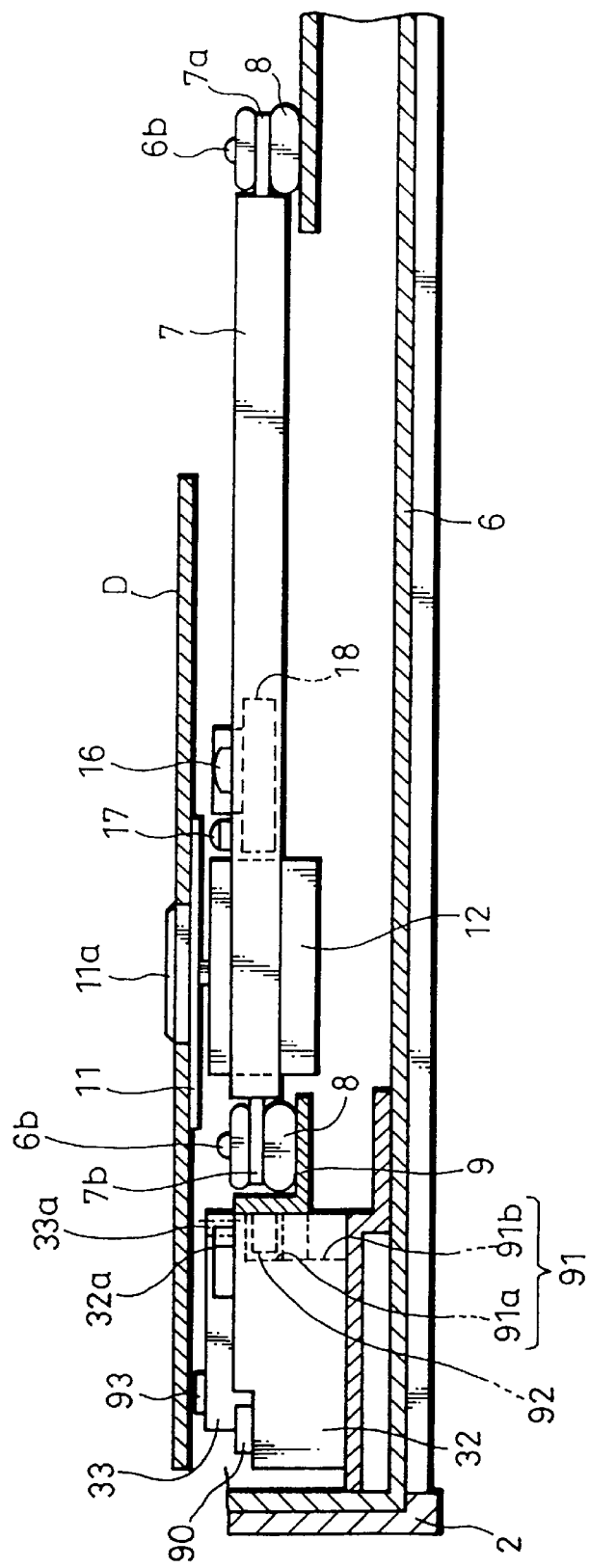
FIG. 8 is a side sectional view of the disk recording/reproducing apparatus shown in FIG. 1 in a disk loading state.
Figure 9:
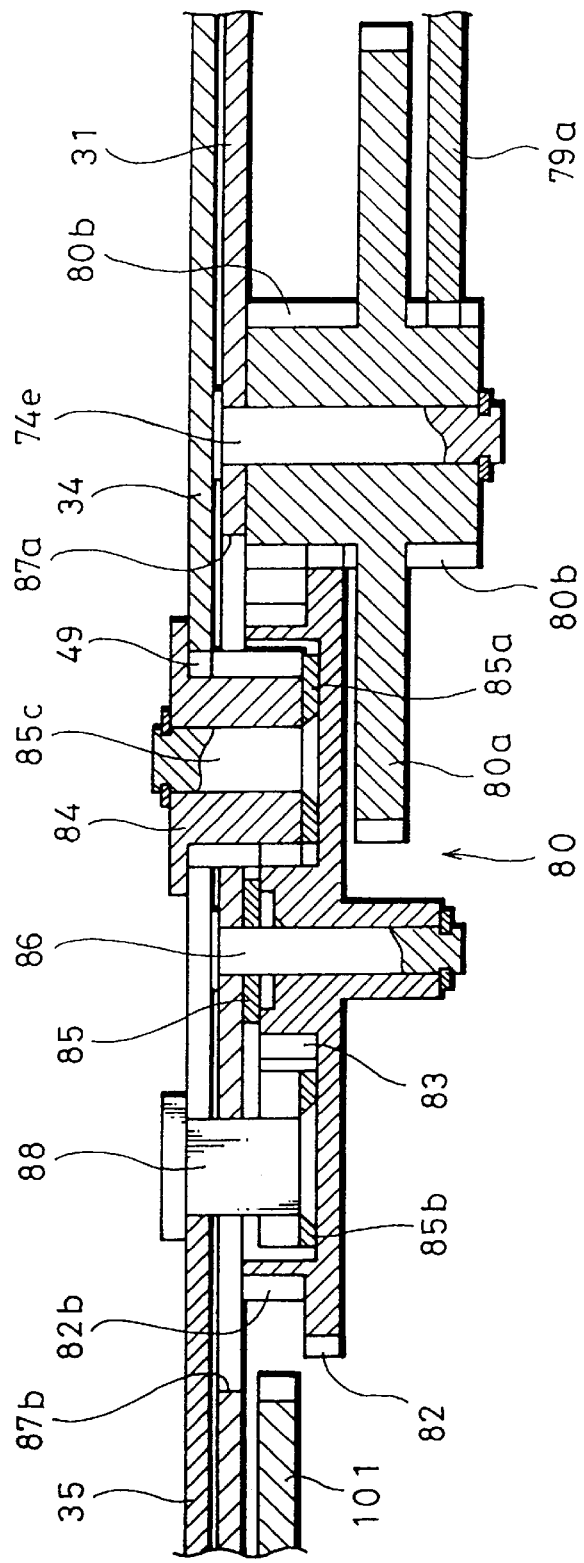
FIG. 9 is a sectional view of a train of loading gears of the disk recording/reproducing apparatus shown in FIG. 1.

The cam groove 91 is curved around the fulcrum shaft 90 so as to take the shape of a circular arc. The cam groove 91 is formed by setting a predetermined difference in level in the vertical direction and coupling its upper level portion 91*a* and its lower level portion 91*b* via a groove having an appropriate inclination angle. To this cam groove 91, a cam pin 92 of the ascent/descent drive lever 9 connected to the tip end portion of the sub-chassis 7 is coupled so as to be slidable. To the extent of the level difference of the cam groove 91, the cam pin 92 ascends or descends. By the ascent/descent operation of the cam pin 92, the attitude of the sub-chassis 7 is switched between the unloading state with the front part lowered as shown in FIG. 7 and the loading state with the sub-chassis 7 being made horizontal as shown in FIG. 8.

On the upper part of the cam lever 32, a fan-shaped gear 32*a* having teeth in its back part side is formed integrally therewith. A fan-shaped gear 33*a* formed in the gear lever 33 engages with the fan-shaped gear 32*a*. It is made possible for the gear lever 33 to conduct an oscillating movement around a fulcrum shaft 93 erected on the base chassis 6. Interlocking with the operation of the second disk holder 37, the gear lever 33 is rotated. As a result, the cam lever conducts the oscillating movement.

As shown in FIG. 12, an opening and closing device 94 of the disk insertion slot 3 is provided. At the time of loading, a stop lever is projected into a central part of the inside of the disk insertion slot 3 to prevent double insertion of optical disk D. As shown in FIG. 11, there are provided a disk insertion detector 95 for detecting the insertion state of the optical disk D, a disk discharge detector 96 for detecting the discharge state of the optical disk D, and a chuck opening detector 97 for detecting a state in which the disk chucking is released.

In order to make it possible to manually rotate the cam gear 76 supported by the top chassis 31 via the shaft at the time of emergency such as an electric power suspension, accident and so on a manual operation mechanism 100 is provided in the top chassis 31. As shown in FIG. 17, the manual operation mechanism 100 includes a swing lever 101 formed so as to be able to engage with the cam gear 76, a lever 102 for making a gear portion 101*a* of the swing lever 101 detachably engage with the external small gear 82*b* of the cam gear 76, and a slide lever 103 for oscillating the lever 102.

The swing lever 101 is formed so as to take the shape of an arch. On its external circular arc portion, the gear portion 101*a* is formed. In the swing lever 101, a guide groove 101*b* taking the shape of a circular arc is formed so as to be nearly parallel to the gear portion 101*a*. At one end of the guide groove 101*b*, a gear engaging portion 101*c* extending radially outward is formed. Respectively to the guide groove 101*b* and the gear engaging portion 101*c*, two guide pins 104*a* and 104*b* fixed to the top chassis 31 are coupled so as to be slidable. By a radially outward level difference caused by the gear engaging portion 101*c*, a swing operation is caused in the swing lever 101.

An intermediate portion of the lever 102 is supported by the top chassis 31 via a fulcrum shaft 105 so as to be rotatable. On one side thereof, a guide groove 102*a* is formed. A guide pin 101*d* formed on the swing lever 101 is coupled to the guide groove 102*a* so as to be slidable. On the other side thereof, a guide pin 102*b* is formed. By a coil spring 106 functioning as a biasing member, the lever 102 is biased in such a direction as to separate the gear portion 101a of the swing lever 101 from the external small gear 82b of the cam gear 76.

The slide lever 103 is formed of a long strip-shaped member. At one end thereof in the longitudinal direction, a transverse guide groove 103a is formed. The guide pin 102b of the lever 102 is coupled to the transverse guide groove 103a so as to be slidable. In a central part of the slide lever 103, longitudinal guide grooves 103b consecutive in the longitudinal direction are formed. To the longitudinal guide grooves 103b, two guide pins 107 fixed to the top chassis 31 are coupled so as to be slidable. As a result, a straight movement in the forward/backward direction is assured. Between the slide lever 103 and the top chassis 31, a coil spring 108 functioning as a biasing member is stretched. By the spring force of the coil spring 108, the slide lever 103 is always biased forward.

Figure 3:
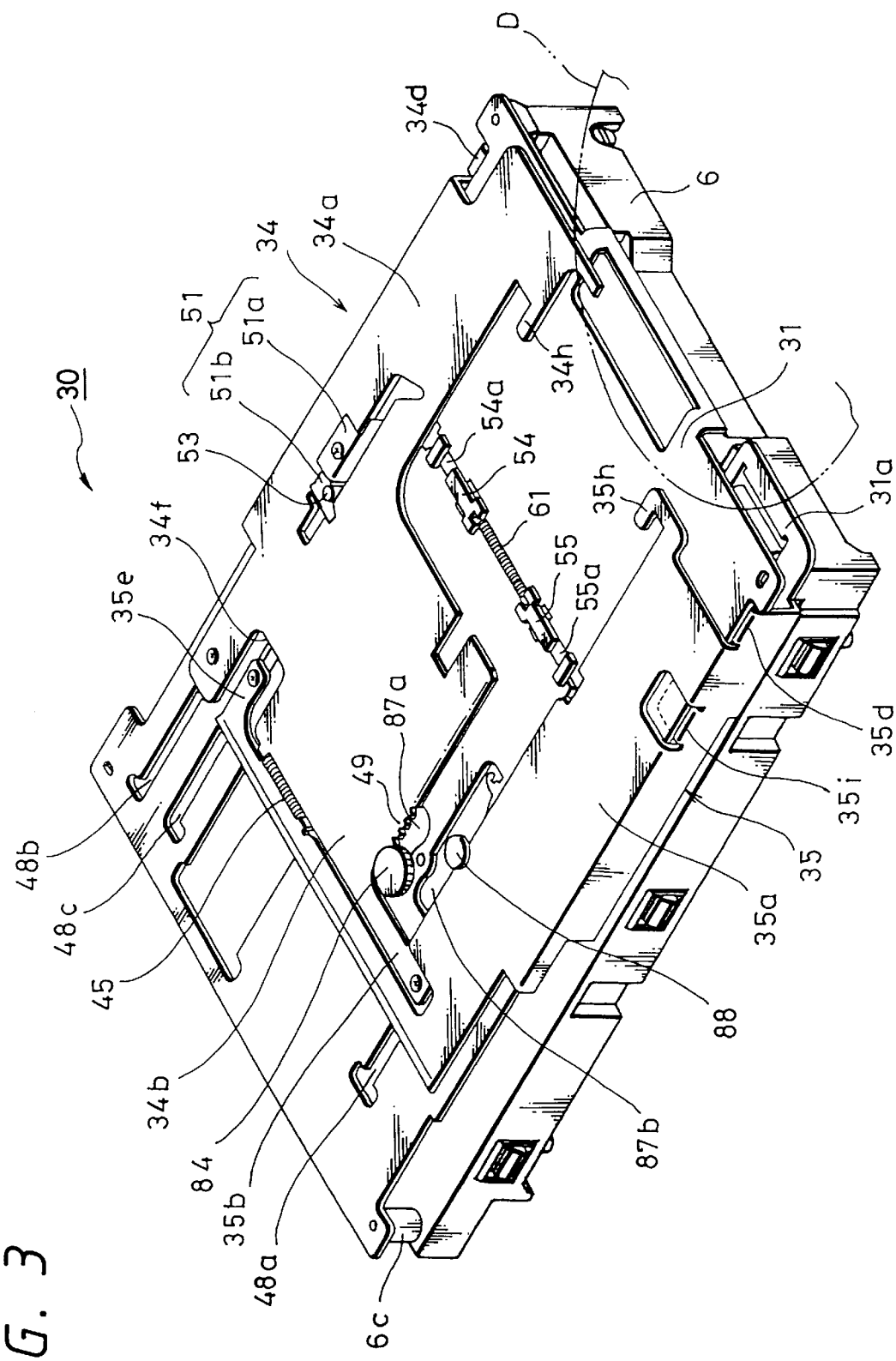
FIG. 3 is an a perspective view of the disk recording/reproducing apparatus shown in FIG. 1 when a base chassis and a top chassis are united.

The disk drive and read mechanism 5 and the disk loading mechanism 30 configured as heretofore described are combined. As shown in FIG. 3, on the base chassis 6 of the disk drive and read mechanism 5, the top chassis 31 of the disk loading mechanism 30 is superimposed. The mounting legs 6c of the base chassis 6 are aligned or matched with predetermined positions of the top chassis 31, and they are coupled. As a result, the chucking ring 62 of the chucking member 56 held by the top chassis 31 is corresponded to the upper portion of the turn table 11 supported by the sub-chassis 7 incorporated into the base chassis 6.

In this way, the base chassis 6 is combined with the top chassis 31. A resultant assembly is inserted into the exterior casing 1 shown in FIG. 1 and then fixed. The front panel 2 is attached to the front opening portion of the exterior casing 1. As a result, the disk insertion slot 3 of the front panel 2 is corresponded to the portion between the front end of the base chassis 6 and the front end of the top chassis 31.

As heretofore described, the disk player apparatus of the present example is formed.

[4] Operation of disk player apparatus

Operation of the disk player apparatus configured as heretofore described will now be described.

(4-1) Loading initial state of optical disk

In the discharge completion state of a preceding optical disk D as shown in FIG. 11, the first disk holder 36 of the disk loading mechanism 30 is projected onto a moving locus of the optical disk D by coupling force of the holder drive gear 70 engaging with the fan-shaped gear 68, against the biasing force of the torsion spring 65a. On the other hand, the second disk holder 37 of the disk loading mechanism 30 is retreated outward (in the counterclockwise direction) by the biasing force of the torsion spring 65b.

(4-2) Loading operation of optical disk

In this state, the optical disk D is manually inserted into the disk insertion slot 3 of the front panel 2 as shown in FIG. 1. First of all, the optical disk D comes into contact with the holding groove 66 of the first disk holder 36 as shown in FIG. 11. If the optical disk D is continuously inserted with a predetermined force, the first disk holder 36 is rotated in the clockwise direction around the fulcrum shaft 64a functioning as the rotation center, in against the biasing force of the torsion spring 65a. At the same time, by the reaction force from the disk holder 36, the optical disk D is pressed toward the second disk holder 37 and moved.

As a result, the optical disk D comes into contact with the input portion 37a of the second disk holder 37. Working force in the clockwise direction caused by the pressing force of the optical disk D acts on the input portion 37a. Therefore, the second disk holder 37 is similarly rotated in the clockwise direction around the fulcrum shaft 64b functioning as the rotation center against the biasing force of the torsion spring 65b. As a result, attitudes of the left and right disk holders 36 and 37 are changed to states as shown in FIG. 12. Sides of the front part of the optical disk D are held by the holding grooves 66 and 67 of the disk holders 36 and 37.

If the insertion force is furthermore applied to the optical disk D, the first disk holder 36 is rotated in the clockwise direction. If the disk holder 36 is rotated and displaced to a predetermined angle, the engagement between the fan-shaped gear 68 and the holder drive gear 70 is released. If the engagement between the fan-shaped gear 68 and the holder drive gear 70 is released, the first disk holder 36 is rotated in the clockwise direction by the biasing force of the torsion spring 65a. As for the second disk holder 37, the width of the optical disk D gradually increases according to the insertion amount of the optical disk D. Therefore, the disk holder 37 is pressed by the optical disk D and rotated in the counterclockwise direction against the biasing force of the torsion spring 65b. As a result, the state shown in FIG. 13 is presented.

If the optical disk D arrives at the holding groove center C of the holding grooves 66 and 67 of the pair of the disk holders 36 and 37 as shown in FIG. 13, the width of the optical disk D becomes its maximum value, i.e., its diameter. Therefore, the optical disk D is gripped between the disk holders 36 and 37 and held from both sides. In this case, the central portion of the optical disk D is sandwiched between the disk holders 36 and 37 and held from both sides. Therefore, the optical disk D is not wobbly and it can be held positively. Furthermore, at this time, an oblique side edge of the optical disk D comes into contact with the operation piece 38c of the eject arm 38. Against the biasing force of the coil spring 89, therefore, the eject arm 38 is rotated in the counterclockwise direction.

If the optical disk D is inserted to such a degree as shown in FIG. 13, this insertion state is detected by the disk insertion detector 95. As a result, the loading motor 42 is driven to rotate. From the output gear 42a attached to the rotation shaft of the loading motor 42, drive force is transmitted to the loading gear train 80 and the unloading gear train 79. In the loading gear train 80, the sun gear 83 of the epicyclic gear 81 is driven to rotate by the torque outputted from the output gear 42a via the two intermediate gears 80a and 80b. The planet gear 84 is driven to rotate in the counterclockwise direction.

Figure 14:
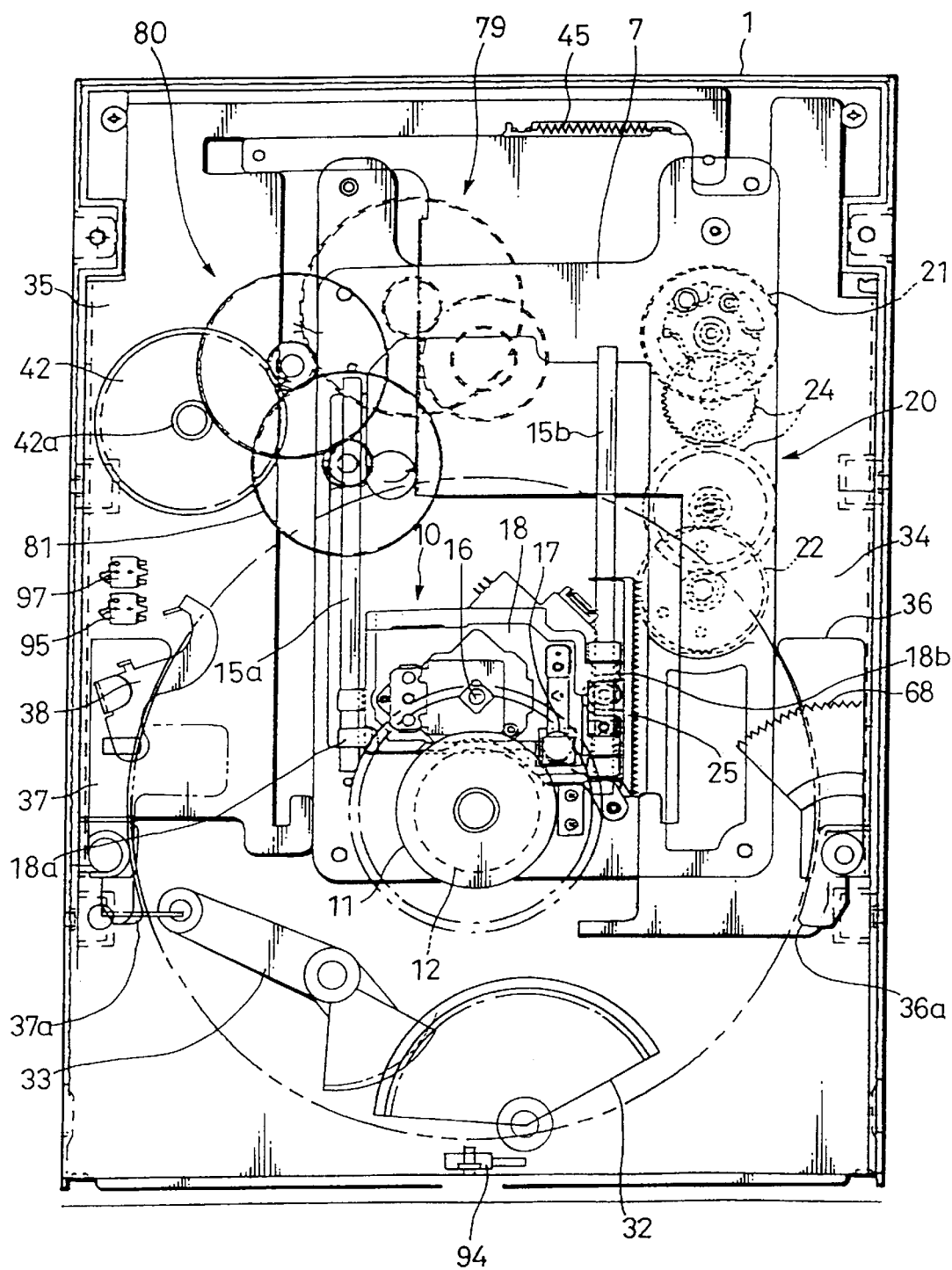
FIG. 14 is a top plan view showing such a state that the optical disk has been moved to a chucking position in the disk loading mechanism of the disk recording/reproducing apparatus shown in FIG. 1.

As a result, the rack portion 49 formed on the first holder plate 34 engages with the planet gear 84. The first holder plate 34 is thus carried in the disk insertion direction. In addition, the second holder plate 35 formed so as to be moved in the disk insertion direction integrally with the first holder plate 34 is carried integrally. As a result, a change from the state of FIG. 13 to the state of FIG. 14 is effected. The optical disk D is corresponded to the upper portion of the turn table 11.

(4-3) Chucking of optical disk

In the state shown in FIG. 14, chucking operation of the optical disk D is conducted.

As shown in FIG. 14, it is detected by the chuck opening detector 97 on the base chassis 6 of the disk drive and read mechanism 5 that the optical disk D is at the predetermined loading position. As a result, the gear lever 33 is driven to rotate in the clockwise direction. At the same time, by the gear lever 33, the cam lever 32 is driven to rotate in the counterclockwise direction. Therefore, the cam groove 91 of the cam lever 32 is driven to rotate. The cam pin 92 coupled to the cam groove 91 ascends from the lower level portion 91b of the lower end to the upper level portion 91a of the upper end along the inclination surface. As a result, the sub-chassis 7 is driven to ascend from the lowered position in which the sub-chassis 7 is inclined obliquely downward as shown in FIG. 7 to the raised position in which the sub-chassis 7 becomes nearly horizontal as shown in FIG. 8.

As a result, the level of the disk placing surface of the turn table 11 mounted on the sub-chassis 7 becomes equal to the level of the lower surface of the chucking member 56 attached to the top chassis 31 as shown in FIG. 6. By the sucking force of the magnet 14 buried in the chucking ring 62 located on the upper surface side of the optical disk D, the optical disk D is chucked on the turn table 11.

At this time, by the retreatment operation of the pair of holder plates 34 and 35, the hook portions 34h and 35h located above the top chassis 31 are engaged with the catch grooves 54a and 55a of the pair of pulley catches 54 and 55 held by the top chassis 31 so as to be slidable. The planet gear 84 of the epicyclic gear 81 moves to the front side of the sun gear 83 while conducting revolution and comes into contact with the front edge of the circular arc groove portion 87a. By the difference between the position at the back end and the position at the front end of the planet gear 84, therefore, the first holder plate 34 is moved outward, i.e., in such a direction as to leave the chucking member 56. Simultaneously therewith, the operation pin 88 rotated integrally with the planet gear 84 via the rotation plate 85 moves to the back side along the outer periphery of the sun gear 83. By the difference between the position at the back end and the position at the front end of the operation pin 88, therefore, the second holder plate 35 is moved outward, i.e., in such a direction as to leave the chucking member 56.

As a result, the nail portions 54d and 55d of the pulley catches 54 and 55 leave the chucking ring 62 as indicated by the two-dot chain lines in FIG. 6. Thus the chucking member 56 can freely rotate. In such a state, the optical disk D is read by the optical pickup device 10.

At the time of loading, the torque transmitted to the unloading gear train 79 is transmitted as far as the fourth intermediate gear 79d via the three intermediate gears 79a through 79c. Because of the location of the notch portion 78a of the gear portion 78, the cam gear 76 does not engage with the intermediate gear 79d. Therefore, the motor torque is not transmitted downstream from the intermediate gear 79d.

(4-4) Eject operation of optical disk

After the optical disk reading has been finished, discharge of the optical disk is conducted as described below.

When a disk discharge command is issued to the drive circuit by pressing the operation button 4 for ejection, the loading motor 42 is driven to rotate in the reverse direction, and the epicyclic gear 81 starts rotation opposite to that conducted at the time of disk loading. As a result, the planet gear 84 and the working pin 88 move in directions opposite to those described above as shown in FIG. 15. Thus, the pair of holder plates 34 and 35 both move inward, i.e., in such a direction as to approach the chucking member 56. At this time, the sub-chassis 7 is lowered in the front part via the operation of the cam lever 32 and the gear lever 33. As a result, the turn table 11 gets out of the chucking member 56, and the optical disk D could be discharged.

By the above described operation of the epicyclic gear 81, the left and right holder plates 34 and 35 are carried forward. Transition from the state of FIG. 15 to the state of FIG. 16 is thus effected. At this time, if the left and right holder plates 34 and 35 advance to the predetermined positions, the operation portion 51b of the plate spring 51 presses the operation pin 53 formed in the cam lever 41 integral with the rack drive gear 75. As a result, the cam lever 41 is rotated in the clockwise direction around the fulcrum shaft 74a. Accordingly, the cam pin 41a which has been coupled to the coupling concave portion 77a of the cam portion 77 of the cam gear 76 until then gets out of the coupling concave portion 77a. Therefore, rotation of the cam gear 76 becomes possible, and the motor torque is transmitted to the rack drive gear 75 via the cam gear 76.

By the rotation of the rack drive gear 75, the rack plate 40 engaging with the rack portion 40d is moved to the front part of the apparatus. As a result, the optical disk D is discharged from the loading position shown in FIG. 16 to the initial discharge position shown in FIG. 11.

When the rack plate 40 is furthermore moved forward, the cam pin 69a of the inject lever 69 is pressed outward along the cam portion 40a formed in the front end portion of the rack plate 40. Therefore, the eject lever 69 is rotated in the clockwise direction around the rotation shaft 71 functioning as the rotation center. As a result, the front rack portion 40c of the rack plate 40 engages with the holder drive gear 70. In addition, the holder drive gear 70 engages with the fan-shaped gear 68 integral with the first disk holder 36.

By the rotation force of the holder drive gear 70, therefore, the first disk holder 36 is rotated inward. As shown in FIG. 11, half or more of the optical disk D is discharged from the disk insertion slot 3. At the same time, by the biasing force of the coil spring 89, the operation piece 38c of the eject arm 38 formed in the holder plate 35 presses the outer peripheral portion of the optical disk D. In such a discharge state of the optical disk D, the chucking aperture d located at the central part of the optical disk D is exposed outside the disk insertion slot 3. Therefore, the optical disk D can be taken out by grasping the central part of the disk D. Thus, there is no fear of making the signal recording surface of the optical disk D dirty.

(4-5) Manual takeout operation of optical disk

In the case where the cam gear 76 supported pivotally by the top chassis 31 via the shaft cannot be rotated due to an electric power suspension, accident or the like, the optical disk D can be manually discharged by operating the manual operation mechanism 100 shown in FIG. 17. That is, by pressing the slide lever 103, the swing lever 101 moves inward while rotating backward via the oscillating operation of the lever 102. At this time, the gear portion 101a of the swing lever 101 engages with the external small gear 82b of the epicyclic gear 81. As a result, the epicyclic gear 81 could be rotated. The rotation torque thereof is transmitted to the rack drive gear 75 via the unloading gear train 79 and the cam gear 76. As a result, the rack plate 40 moves forward, and consequently the optical disk D is discharged.

Heretofore, the present invention has been described. However, the present invention is not limited to the above described embodiment. For example, in the above described embodiment, an optical disk such as a CD, a CD-ROM or the like is used as a disk-like recording medium. However, the present invention can be applied to various disk recording/reproducing apparatuses for conducting recording and/or reproducing by using a magneto-optical disk such as a MO or the like as a disk-like recording medium. Furthermore, in the above described embodiment, a disk reproducing apparatus of slot-in system for reproducing (reading) information recorded on an optical disk D has been described. As a matter of course, however, the present invention can be applied to record only apparatuses for conducting only information recording. In addition, the present invention can be applied to disk recording/reproducing apparatuses capable of conducting both information recording and information reproducing. In this way, the present invention is not limited to the above described embodiment, but various changes can be made without departing from the spirit of the invention.

Having described preferred embodiments of the present invention with reference to the accompanying drawings, it is to be understood that the present invention is not limited to the above-mentioned embodiments and that various changes and modifications can be effected therein by one skilled in the art without departing from the spirit or scope of the present invention as defined in the appended claims.

What is claimed is:

1. A disk reproducing apparatus for reproducing at least information recorded on an information recording surface of a disk-like recording medium, comprising:

a pair of disk holders each having a groove for holding a periphery portion of a disk-like recording medium;

a first biasing means for supporting said pair of disk holders so as to be movable in a direction crossing an insertion direction of said disk-like recording medium and biasing said pair of disk holders in such a direction as to make said pair of disk holders approach each other;

second biasing means for biasing said pair of disk holders in such a direction as to make said pair of disk holders leave said disk-like recording medium;

loading means, responsive to insertion start of said disk-like recording medium, for carrying said disk-like recording medium held by said pair of disk holders to a disk chucking position;

said loading means comprises a loading motor, and a gear mechanism rotated by a rotation torque of said loading motor so as to move and actuate said pair of disk holders, and wherein said gear mechanism actuates said pair of disk holders so as to cause said disk-like recording medium to be gripped by said pair of disk holders and cause the gripped disk-like recording medium to be released;

an epicyclic gear mechanism that includes a sun gear and a planet gear engaging with said sun gear and revolving around said sun gear as a center;

said epicyclic gear mechanism comprises a working member rotated integrally with said planet gear in response to rotation operation of said sun gear, and wherein a movement of said working member and said planet gear along an outer periphery of said sun gear causes said disk-like recording medium to be gripped by said pair of disk holders and released from gripping thereby; and a first support member and a second support member respectively for holding said pair of disk holders, wherein said first support member comprises a rack portion engaging with said planet gear, and said second support member comprises a guide portion to which said working member comes into contact so as to be slidable.

2. A disk reproducing apparatus according to claim 1, further comprising:

a chucking means for chucking a disk-like recording medium carried to said disk chucking position to a disk table, wherein said loading means moves and actuates said first and second support members so as to carry the disk-like recording medium to said disk chucking position, restricts a movement of said chucking means to said disk table, and releases the restriction.

3. A disk reproducing apparatus for reproducing at least information recorded on an information recording surface of a disk shaped recording medium, comprising:

a pair of opposing disk holders each having a groove for holding a periphery portion of a disk shaped recording medium, the pair of disk holders each being rotatable toward and away from each other;

a pair of holder plates each supporting one of the pair of disk holders, the holder plates are each slidable in the disk insertion direction;

first biasing means for biasing said pair of disk holders in such a direction as to make said pair of disk holders rotate away from each other;

an input portion formed on one of said disk holders that receives insertion force of said disk and causes said one disk holder to rotate against the bias of said first biasing means so that said pair of disk holders engage opposing sides of the disk periphery with said grooves;

loading means, responsive to insertion force of the disk, for moving said holder plates in the disk insertion direction in unison to carry the disk held by said pair of disk holders to a disk chucking position.

4. A disk reproducing apparatus according to claim 1, further comprising:

a second biasing means for biasing said pair of holder plates in a direction crossing the insertion direction of the disk as to make said pair of holder plates approach each other.

5. A disk reproducing apparatus according to claim 1, wherein said loading means comprises a loading motor, and a gear mechanism rotated by a rotation torque of said loading motor so as to move and actuate said pair of disk holders, and wherein said gear mechanism actuates said pair of disk holders so as to cause said disk-like recording medium to be gripped by said pair of disk holders and cause the gripped disk-like recording medium to be released.

* * * * *